(12) United States Patent
Tani

(10) Patent No.: US 6,841,340 B2
(45) Date of Patent: Jan. 11, 2005

(54) OPTICAL FABRICATING METHOD AND APPARATUS

(75) Inventor: Takeharu Tani, Kanagawa (JP)

(73) Assignee: Fuji Photo Film Co., Ltd., Kanagawa (JP)

( * ) Notice: Subject to any disclaimer, the term of this patent is extended or adjusted under 35 U.S.C. 154(b) by 199 days.

(21) Appl. No.: 10/193,138

(22) Filed: Jul. 12, 2002

(65) Prior Publication Data

US 2003/0013047 A1 Jan. 16, 2003

(30) Foreign Application Priority Data

Jul. 13, 2001 (JP) .......................... 2001-214153
Jul. 13, 2001 (JP) .......................... 2001-214154

(51) Int. Cl.[7] .............................................. B29C 35/08
(52) U.S. Cl. .................... 430/320; 430/394; 430/397; 430/396; 355/55; 355/53; 355/67; 264/494
(58) Field of Search ........................ 430/320, 394, 430/397, 396; 355/55, 53, 67; 264/494

(56) References Cited

U.S. PATENT DOCUMENTS 6,295,123 B1 * 9/2001 Wang .......................... 355/71
6,383,940 B1 * 5/2002 Yoshimura ................. 438/708

FOREIGN PATENT DOCUMENTS

JP 56-144478 11/1981
JP 63-40650 8/1988

OTHER PUBLICATIONS

S. Maruo et al., "Three–dimensional microfabrication with two–photon–absorbed photopolymerization", Optics Letters, vol. 22, No. 2, Jan. 15, 1997, pp. 132–134.
Brian H. Cumpston et al., "Two–photon polymerization initiators for three–dimensional optical data storage and micorfabrication", NATURE, vol. 398, Mar. 4, 1999, pp. 51–54.

* cited by examiner

Primary Examiner—Mark F. Huff
Assistant Examiner—Daborah Chacko-Davis
(74) Attorney, Agent, or Firm—Sughrue Mion, PLLC

(57) ABSTRACT

A highly accurate structure is optically fabricated simply and in a short time. Rough optical fabrication using an ultraviolet-irradiation optical fabrication process is carried out for a photo-curing resin by emission of a laser beam from a first light source, and thereafter, fine optical fabrication using a two-photon absorption optical fabrication process is carried out by emission of a laser beam from a second light source. As a result, it is possible to realize optical fabrication which allows fabrication of a fine structure using a two-photon absorption optical fabrication process while realizing high speed processing using the ultraviolet-irradiation optical fabrication process.

36 Claims, 14 Drawing Sheets

OPTICAL FABRICATING METHOD AND APPARATUS

BACKGROUND OF THE INVENTION

1. Field of the Invention

The present invention relates to an optical fabricating method and apparatus, and particularly to an optical fabricating method and apparatus in which light is applied to a photo-curing material, which is cured by being irradiated with light, to allow fabrication of a structure.

2. Description of the Related Art

An optical fabricating method (laser lithography) has been conventionally known, in which photo-curing resin (photoresist), which has the property in that a portion thereof irradiated with light is cured, is used and a position irradiated with light is moved in accordance with a predetermined pattern to thereby form a three-dimensional structure (see Japanese Patent Application Laid-Open (JP-A) No. 56-144478). The photo-curing resin is cured in such a manner that a monomer in the resin is polymerized by absorption of light. The polymerized portion is solidified, and therefore, a non-cured liquid portion is removed to allow formation of a three-dimensional structure. In this optical fabricating method, the photo-curing resin exhibits a high absorptivity in an ultraviolet wavelength (typically, 300 nm to 400 nm), and an ultraviolet laser or an ultraviolet lamp is used as a light source.

However, in a conventional optical fabricating method utilizing ultraviolet irradiation (hereinafter referred to as an ultraviolet-irradiation optical fabricating method), there has been known that high speed fabricating is permitted, but processing accuracy is low. That is, in the ultraviolet-irradiation optical fabricating method, light is absorbed not only at a light focused point but also in portions irradiated with light and a curing reaction occurs therein. Therefore, processing accuracy is low (10 to several tens of $\mu$m), and a laminated structure merely can be formed.

In order to realize highly accurate fabricating, a fabricating method has been recently proposed, in which light having a wavelength which is double an absorption wavelength, that is, typically, 600 to 800 nm, is used instead of using ultraviolet irradiation, and the light is absorbed by a two-photon absorption phenomenon to allow formation of a three-dimensional structure (hereinafter referred to as a two-photon absorption optical fabricating method) (see Japanese Patent Application Publication (JP-B) No. 63-40650).

The two-photon absorption phenomenon has a nonlinear absorption characteristic in which an amount of absorption is proportional to a square of light intensity, and also has a high three-dimensional spatial resolution. With this characteristic employed, formation of a much finer structure can be realized compared with normal optical fabrication. Typically, the two-photon absorption optical fabricating method is used to form a three-dimensional structure. That is, the structure is decomposed into a set of dots and is cured with an irradiation position displaced by one point at a time, or a light focused spot is moved with light applied thereto, and an obtained set of lines is used to form the structure.

However, in either case of point curing and line curing, it is necessary that fixed light energy or more be absorbed so as to cure a unit area. Particularly, the two-photon absorption phenomenon has a low absorption probability compared with absorption in the ultraviolet-irradiation optical fabricating method. Although reduction of time is allowed with the output of a light source increased, ablation may occur at a fixed output or more, thereby resulting in breakage of resin.

As a result, in order to form structures of large size in great quantities, the two-photon absorption optical fabricating method using a two-photon absorption phenomenon has a small throughput, which practically becomes a problem. Therefore, reduction of the fabricating time is demanded.

SUMMARY OF THE INVENTION

In view of the aforementioned circumstances, an object of the present invention is to provide an optical fabricating method and apparatus, in which a highly accurate structure can be optically fabricated simply and in a short period of time.

In order to achieve the aforementioned object, a first aspect of the present invention is an optical fabricating apparatus in which a photo-curing material (a photocurable material), which is accommodated in a container and cured by being irradiated with light, is irradiated with light at an energy level necessary to cure the photo-curing material to thereby form a structure, the apparatus comprising: a light source section having a first light source that applies a first light to the photo-curing material, and a second light source that applies a second light, which causes a multiple photon absorption phenomenon, to the photo-curing material; a light focusing section which focuses the first light and the second light so that the energy of each of the first light and the second light becomes a level necessary to cure the photo-curing material; a changing section for changing a position at which light is focused by the light focusing section in the container; and a control section for effecting a preprocessing, in which light irradiation by the first light source and changing of a light focusing position are performed, so that a pre-shape, which is determined on the basis of a size of a structure of a predetermined shape to be fabricated, is fabricated, and thereafter, and a main processing, in which light irradiation by the second light source and changing of the light focusing position are performed, so that the predetermined shape is fabricated from the pre-shape.

In the optical fabricating apparatus of the present invention, a structure is fabricated in such a manner that a photo-curing material, which is accommodated in a container and cured by being irradiated with light, is irradiated with light at an energy level necessary to cure the photo-curing material. The light applied to the photo-curing material is emitted from the first light source and the second light source, which are provided in the light source section. The first light source applies first light to the photo-curing material. The second light source applies second light, which causes a multiple photon absorption phenomenon, for example, a two-photon absorption phenomenon, to the photo-curing material. Light emitted from the light source section is focused by a light focusing section in the photo-curing material accommodated in the container. In this case, the first light and the second light are focused so that each light energy thereof becomes an energy level necessary to cure the photo-curing material. The position in which light is focused in the container is changed by the changing section. The changing of the light focusing position, and the light source section are controlled by the control section. The control section controls so as to effect a preprocessing, in which light irradiation by the first light source and changing of a light focusing position are performed, so that a pre-shape, which is determined on the basis of a size of a structure of a predetermined shape to be fabricated, is fabricated, Thereafter, the control section controls a main processing, in which light irradiation by the second light source and changing of the light focusing position are performed, so that the predetermined shape is fabricated from the pre-shape. That is, rough fabricating is carried out in the preprocessing, and fine fabricating is carried out in the main processing. As a result, a fine structure can be fabricated in a short time.

In accordance with a second aspect of the present invention, in the optical fabricating apparatus of the first aspect, the changing section comprises a scanning section for scanning two-dimensionally a position in which light from the light source section is focused, and a moving section for moving at least one of the light focusing position and a position of the photo-curing material in a direction intersecting a scan surface scanned by the scanning section.

A focusing position is preferably changed in accordance with the shape of a structure to be fabricated. In order that the light focusing position may be changed in a three-dimensional manner, the changing section is provided so as to change the focusing position separately using the scanning section and the moving section. As a result, the focusing position is readily changed. That is, the scanning section scans two-dimensionally the position in which light from the light source section is focused. The moving section moves at least one of the light focusing position and the position of the photo-curing material in a direction which intersects the scan surface.

In accordance with a third aspect of the present invention, in the optical fabricating apparatus of the first or second aspect, the light source section comprises a switching section which effects switching between irradiation by the first light source and irradiation by the second light source to allow irradiation of light from one of the light sources.

When light from the first light source and light form the second light source are both applied to the photo-curing material, the action of light due to the first light source and the action of light due to the second light source are produced at the same time. This is not preferable. Accordingly, the light source section includes a switching section which effects switching between irradiation by the first light source and irradiation by the second light source to allow irradiation of light from one of the light sources, thereby allowing separation of the actions of the light sources.

In accordance with a fourth aspect of the present invention, in the optical fabricating apparatus of one of the first to third aspects, the first light source emits light having a wavelength in an ultraviolet region.

A light source which emits light having a wavelength in an ultraviolet region is used as the first light source, and therefore, common photo-curing material can be used. As a result, flexibility of the optical fabricating apparatus improves.

In accordance with a fifth aspect of the present invention, in the optical fabricating apparatus of one of the first to fourth aspects, the second light source includes a harmonic generating element and makes light emitted from the first light source into second light by which the multiple photon absorption phenomenon occurs.

The second light source emits second light which causes a multiple photon absorption phenomenon. However, when the second light source is provided separately from the first light source, the apparatus is made larger. Accordingly, so long as a harmonics generating element such as SHG is used as the second light source and light emitted from the first light source is made into the second light which causes a multiple photon absorption phenomenon by the action of a harmonics generating element, the first light source also serves as the second light source and the apparatus can be made smaller.

In accordance with a sixth aspect of the present invention, in the optical fabricating apparatus of the fifth aspect, the switching section is an exchanging section which exchanges a filter to one of a first optical filter which transmits light from the first light source, and a second optical filter which transmits light from the second light source.

When a harmonics generating element such as SHG is used as the second light source, light from the first light source and light from the second light source approach each other or substantially join together. Therefore, there are cases in which light from the first light source and light from the second light source are difficult to separate from each other. So long as the switching section is formed by the exchanging section which exchanges a filter to one of a first optical filter which transmits light from the first light source, and a second optical filter which transmits light from the second light source, light from the first light source and light from the second light source can be readily separated and used.

The function of the aforementioned optical fabricating apparatus can be easily achieved by the following optical fabricating method. Specifically, a seventh aspect of the present invention is an optical fabricating method in which a photo-curing material, which is accommodated in a container and cured by being irradiated with light, is irradiated with light at an energy level necessary to cure the photo-curing material to thereby form a structure, the method comprising the steps of: focusing light so that light energy of a first light applied to the photo-curing material and a second light applied to the photo-curing material and causing a multiple photon absorption phenomenon becomes an energy level necessary to cure the photo-curing material; applying the first light so that a pre-shape, which is determined on the basis of a size of a structure of a predetermined shape to be fabricated, is fabricated, and thereafter, applying the second light so that the predetermined shape is fabricated from the pre-shape, with changing the light focusing position in the container, thereby fabricating the structure of the predetermined shape.

In accordance with an eighth aspect of the present invention, in the optical fabricating method of the seventh aspect, the light focusing position is scanned in a two-dimensional manner and at least one of the light focusing position and a position of the photo-curing material is moved in a direction intersecting a scan surface, thereby allowing the light focusing position to change in the container.

In accordance with a ninth aspect of the present invention, in the optical fabricating method of the seventh or eighth aspect, when the photo-curing material is irradiated with light, irradiation of one of the first light and the second light is carried out in an exchangeable manner.

In accordance with a tenth aspect of the present invention, in the optical fabricating method of one of the seventh to ninth aspects, the first light is one having a wavelength in an ultraviolet region.

In accordance with an eleventh aspect of the present invention, in the optical fabricating method of one of the seventh to tenth aspects, the second light is one, by which the multiple photon absorption phenomenon occurs, generated from the first light by a harmonic generating phenomenon.

In accordance with a twelfth aspect of the present invention, in the optical fabricating method of the eleventh aspect, when the photo-curing material is irradiated with light, one of a first optical filter which transmits the first light and a second optical filter which transmits the second light is used in an exchangeable manner.

A thirteenth aspect of the present invention is an optical fabricating apparatus in which a photo-curing material, which is accommodated in a container and cured by being irradiated with light, is irradiated with light at an energy level necessary to cure the photo-curing material to thereby form a structure, the apparatus comprising: a light source section which applies light, which causes a multiple photon absorption phenomenon, to the photo-curing material; a light focusing section which focuses light so that light energy from the light source section becomes an energy level necessary to cure the photo-curing material; a holding section which can be immersed in the photo-curing material accommodated in the container and which holds a previously-fabricated article; a changing section for changing a position at which light is focused by the light focusing section in the container; and a control section which controls, in order to form a structure of a predetermined shape to be fabricated, so that irradiation of light by the light source section near the article, and changing of the light focusing position are carried out.

In the optical fabricating apparatus of the aforementioned aspect, a structure is fabricated in such a manner that a photo-curing material, which is accommodated in a container and cured by irradiated with light, is irradiated with light at an energy level necessary to cure the photo-curing material. Light applied to the photo-curing material is emitted from the light source section. The light source section applies light, which causes a multiple-photon absorption phenomenon, for example, a two-photon absorption phenomenon, to the photo-curing material. Light emitted from the light source section is focused by the light focusing section in the photo-curing material in the container. In this case, light focusing is carried out in a condition in which light energy becomes an energy level necessary to cure the photo-curing material. A previously-fabricated article held by the holding section can be immersed in the photo-curing material accommodated in the container. Further, the position in which light is focused in the container is changed by the changing section. Changing of the light focusing position is controlled by the control section. In order to form a structure of a predetermined shape to be fabricated, the control section so as to carry out light irradiation by the light source section near the article and changing of the light focusing position. That is, a previously-fabricated article is finely fabricated by optical fabrication (the structure is added to the article). As a result, fine fabricating for a previously-fabricated article becomes possible and a fine structure can be fabricated in a short time.

In accordance with a fourteenth aspect of the present invention, in the optical fabricating apparatus of the thirteenth aspect, the article is fabricated from one of a transparent material and a semi-transparent material.

When a structure is additionally fabricated for an article, in the present invention, light emitted from the light source may be reflected or shielded by the article. When the article is fabricated from a transparent material or a semi-transparent material is used, a structure can be fabricated in the interior of the article. Further, reflection of light from the article can be restrained.

The aforementioned article is preferably a hollow pipe.

That is, a hollow pipe can be used as the article. Generally, it is difficult to form a structure within the hollow pipe. The optical fabricating apparatus of the present invention facilitates fabrication of a structure within the hollow pipe. As a result, the shape of the structure to be fabricated can be freely designed and the degree of freedom of design increases.

Further, the control section permits fabrication of the hollow pipe to allow a fluid to pass therethrough in one direction.

The hollow pipe may be used for flow of a fluid. Accordingly, when a structure is fabricated inside the hollow pipe to allow a fluid to pass (flow) in one direction, the structure can be fabricated so as to serve as a so-called shield valve or one-way valve. As a result, the degree of freedom of design increases.

The function of the optical fabricating apparatus can be easily achieved by the following optical fabricating method. Specifically, a fifteenth aspect of the present invention is an optical fabricating method in which a photo-curing material, which is accommodated in a container and cured by being irradiated with light, is irradiated with light at an energy level necessary to cure the photo-curing material to thereby form a structure, the method comprising the steps of: focusing light so that light energy of light applied to the photo-curing material and causing a multiple photon absorption phenomenon becomes an energy level necessary to cure the photo-curing material; immersing a previously-fabricated article in the photo-curing material accommodated in the container; changing a position in which light is focused in the container; and in order to form a structure of a predetermined shape to be fabricated, applying light, which causes the multiple photon absorption phenomenon, near the article, and changing the light focusing position in the container, thereby allowing fabrication of the structure of a predetermined shape.

In accordance with a sixteenth aspect of the present invention, in the optical fabricating method of the fifteenth aspect, the article is fabricated from a transparent material or a semi-transparent material.

In accordance with a seventeenth aspect of the present invention according to the first aspect, the pre-shape is fabricated based on a first block and smaller than the predetermined shape, and the predetermined shape is fabricated from the pre-shape based on a second block which is smaller than the first block.

In accordance with an eighteenth aspect of the present invention according to the seventh aspect, the pre-shape is fabricated based on a first block and smaller than the predetermined shape, and the predetermined shape is fabricated from the pre-shape based on a second block which is smaller than the first block.

BRIEF DESCRIPTION OF THE DRAWINGS

FIG. 4A shows the outside of the structure; and FIG. 4B is a partially enlarged view of the structure.

FIG. 12A shows the layout of articles which form a structure to be fabricated; and FIG. 12B shows the outside of the fabricated structure.

FIG. 13A shows a block passage which blocks a flow passage; FIG. 13B shows an obturator; and FIG. 13C shows the outside of a check valve which is a fabricated structure.

DESCRIPTION OF THE PREFERRED EMBODIMENTS

A description will be hereinafter given of one of embodiments of the present invention in detail with reference to the attached drawings. The present embodiment is an embodiment in which the present invention is applied to an optical fabrication (a laser lithographic) apparatus.

[First Embodiment]

In order that a unit volume be cured (hardened) by optical fabrication, absorption of constant light energy or more is necessary. Particularly, the two-photon absorption phenomenon exhibits a lower absorption probability compared with normal light absorption. Accordingly, it is possible to reduce an irradiation time by increasing an output of a light source. However, when the output of the light source is a constant value or more, resin is broken due to ablation or the like. The present inventor has found by experiments that the irradiation time of about 0.01 s/$\mu$m$^3$ or more is required in a practical output range of a light source in order to cure resin in a two-photon absorption optical fabrication process. Accordingly, at least a time expressed by V×0.01(s) is required in fabricating a structure having a volume V ($\mu$m$^3$).

In the two-photon absorption optical fabrication process, because the throughput thereof is low. Fabricating a large quantity of large size structures practically becomes a problem. Reduction of the fabricating time is demanded.

In the ultraviolet-irradiation optical fabrication process, when light having the same power as that of the two-photon absorption is used, resin can be cured at the rate of 1 e$^{-8}$s/$\mu$m$^3$ per a unit volume and resin curing is performed at an exceedingly high speed compared with the two-photon absorption optical fabrication. However, in the ultraviolet-irradiation optical fabrication process, light is absorbed not only at a light focused point but also in portions irradiated with light, and a curing reaction occurs in the portion. Therefore, processing accuracy is deteriorated compared with the two-photon absorption optical fabrication (10 to several tens of $\mu$m).

Accordingly, in the present embodiment, rough light fabricating is carried out by the ultraviolet-irradiation optical fabrication, and thereafter, optical fabrication is continuously carried out by the two-photon absorption optical fabrication process, thereby realizing high-speed and highly accurate optical fabrication.

Figure 1:
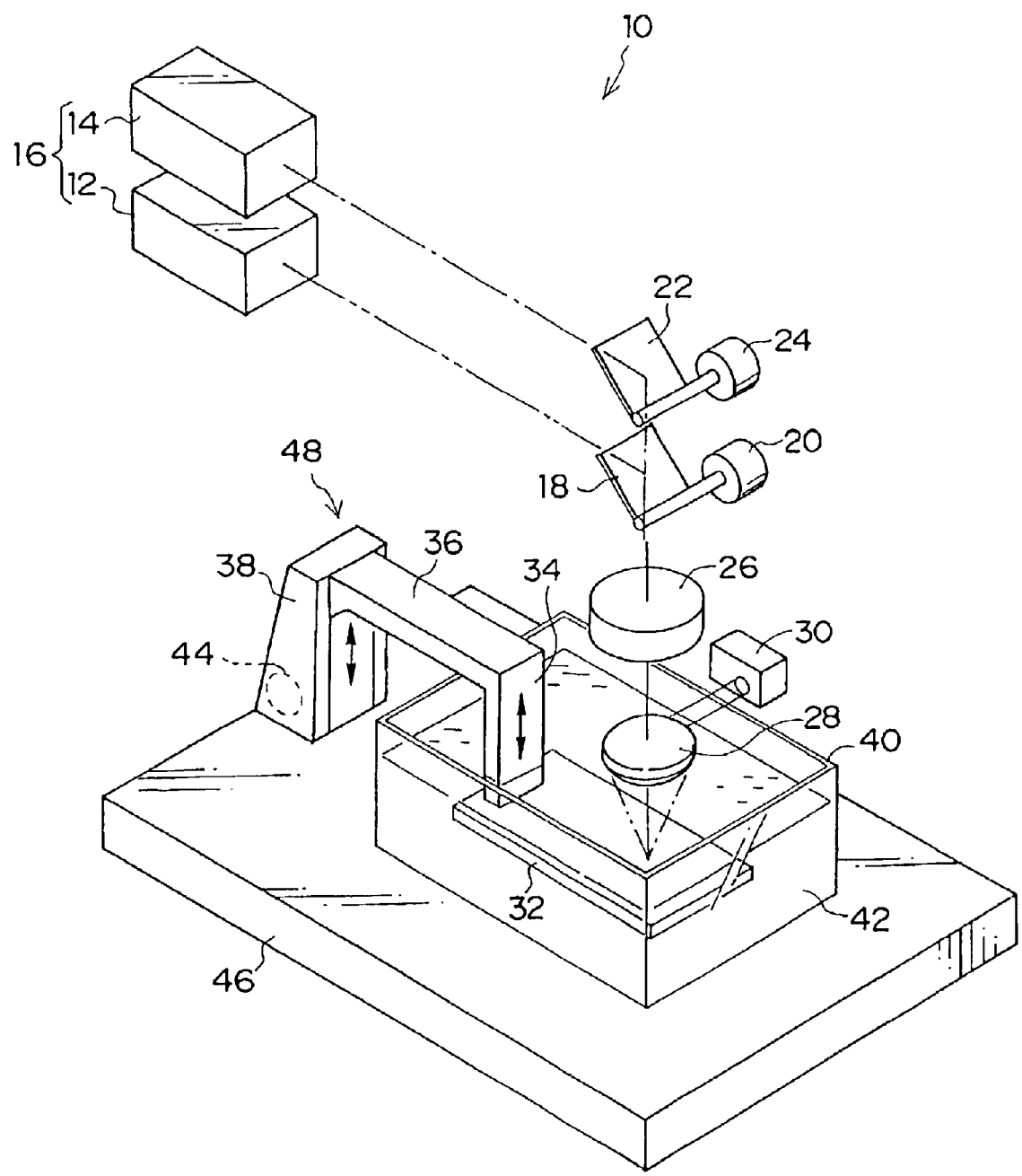
FIG. 1 is a schematic diagram showing the outside of an optical fabricating apparatus according to a first embodiment of the present invention.

FIG. 1 schematically shows the structure of an optical fabricating apparatus 10 according to a first embodiment to which the present invention can be applied. The optical fabricating apparatus 10 of the present embodiment includes a light source section 16 comprised of a first laser light source 12 and a second laser light source 14. The light source section 16 comprised of the first laser light source 12 and the second laser light source 14 is connected to a control device 50 (see FIG. 2) for controlling a process in which optical fabrication is carried out in accordance with a predetermined pattern.

The first laser light source 12 is a light source used to carry out optical fabrication using a conventional ultraviolet-irradiation optical fabrication process. In the present embodiment, a He—Cd laser having a wavelength of 325 nm and an output of 10 mW is used as the first laser light source 12. In the present embodiment, a laser light source is used as the first laser light source 12 used by the ultraviolet-irradiation optical fabrication process. However, the present invention is not limited to the same, and any light source which emits light in the range of ultraviolet wavelength may be used. For example, an Nd:YAG-triple harmonic laser, or a discharge lamp such as a mercury lamp may also be used.

The second laser light source 14 is a light source used to carry out optical fabrication using the two-photon absorption optical fabrication process. In the present embodiment, a Ti:Sapphire pulse laser is used. The Ti:Sapphire pulse laser is one having a wavelength of 700 nm, a pulse width of 100 fs (femtosecond) and a repetition rate of 100 MHz, and an average output of 10 mW can be obtained. In the present embodiment, a Ti:Sapphire pulse laser is used as the second laser light source 14 used by the two-photon absorption optical fabrication process, but the present invention is not limited to the same. The second laser light source 14 may be a light source which allows optical fabrication based on the two-photon absorption optical fabrication process. So long as the Ti:Sapphire pulse laser is used, an output peak can be made higher with a short pulse and a two-photon absorption phenomenon can be efficiently produced.

A dichroic mirror 18 is provided at the side of the first laser light source 12 from which light is emitted, and a reflecting mirror 22 is provided at the side of the second laser light source 14 from which light is emitted. The dichroic mirror 18 reflects a laser beam emitted from the first laser light source 12 and transmits a laser beam emitted from the second laser light source 14. Specifically, the dichroic mirror 18 transmits light having a wavelength of 700 nm or thereabouts, and reflects desired light having a wavelength of 325 nm or thereabouts. It suffices that the reflecting mirror 22 may reflect at least a laser beam emitted from the second laser light source 14, and specifically, may reflect light having a wavelength of 700 nm or thereabouts.

The dichroic mirror 18 is mounted at a first driving section 20 for deflecting reflected light in biaxial directions intersecting the optical axis for the purpose of two-dimensional scanning of spot light. Similarly, the reflecting mirror 22 is mounted at a second driving section 24 for deflecting reflected light in biaxial directions intersecting the optical axis.

A light modulation mechanism 26 and a focusing lens 28 are sequentially disposed at the reflection side of the dichroic mirror 18 and the reflecting mirror 22.

The light modulation mechanism 26 switches, for a laser beam passing therethrough, to shielding or to transmission. In the present embodiment, an acousto-optical modulation element (AOM) is used as the light modulation mechanism 26, but the present invention is not limited to the same. Any mechanism may be used, which can switch, for a laser beam passing therethrough, to shielding or to transmission. For example, a mechanical shutter which mechanically closes and opens to shield or transmit a laser beam, an electro-optic modulation element (EOM) which switches to light shielding or light transmission due to an electro-optic effect, an LCD shutter which switches to light shielding or light transmission by means of a liquid crystal, or the like can be used.

The focusing lens 28 is used to focus an incident laser beam in spot-like manner, and is mounted at a moving mechanism 30 for moving and adjusting the focusing lens 28 in a direction along the optical axis. In the present embodiment, a lens system of which N.A. is 0.8 is used as the focusing lens 28. Adjustment of a light focusing position, which is made by deflection of reflection angles of the dichroic mirror 18 and the reflecting mirror 22 and movement/adjustment of the focusing lens 28, functions as a focusing-point moving mechanism.

In the foregoing, laser beams emitted from the first laser light source 12 and the second laser light source 14 are focused by a single focusing lens 28, but the present invention is not limited to the same. Each laser beam may be formed as an independent optical system.

A container 40 is positioned on a desk (base plate 46) at the side of the focusing lens 28 in which light is focused. The container 40 is mounted (placed) on the base plate 46 at a predetermined position. A vertical movement mechanism 48 is provided on the base plate 46. The vertical movement mechanism 48 is comprised of a supporting pole 38, an arm 36, a pole 34, a supporting plate 32 and a vertical driving section 44.

In other words, the supporting pole 38, which is equipped with the arm 36 disposed above the container 40, is fixed onto the base plate 46. The pole 34 equipped with the supporting plate 32 for holding an object to be fabricated is supported at the end of the arm 36 so as to be movable vertically. The vertical movement of the pole 34 is performed by the vertical driving section 44. The supporting plate 32 can be immersed in a photo-curing resin 42 accommodated in the container 40, and an interval between the supporting plate 32 and the liquid surface of the photo-curing resin 42 can be adjusted by the vertical movement of the container 40. That is, the supporting plate 32 is vertically moved by an operation of the vertical motion mechanism 48, and the container 40 is vertically moved accordingly. The supporting plate 32 may be a substantially transparent flat plate. For example, a flat plate made of glass or acrylic resin can be used.

Figure 2:
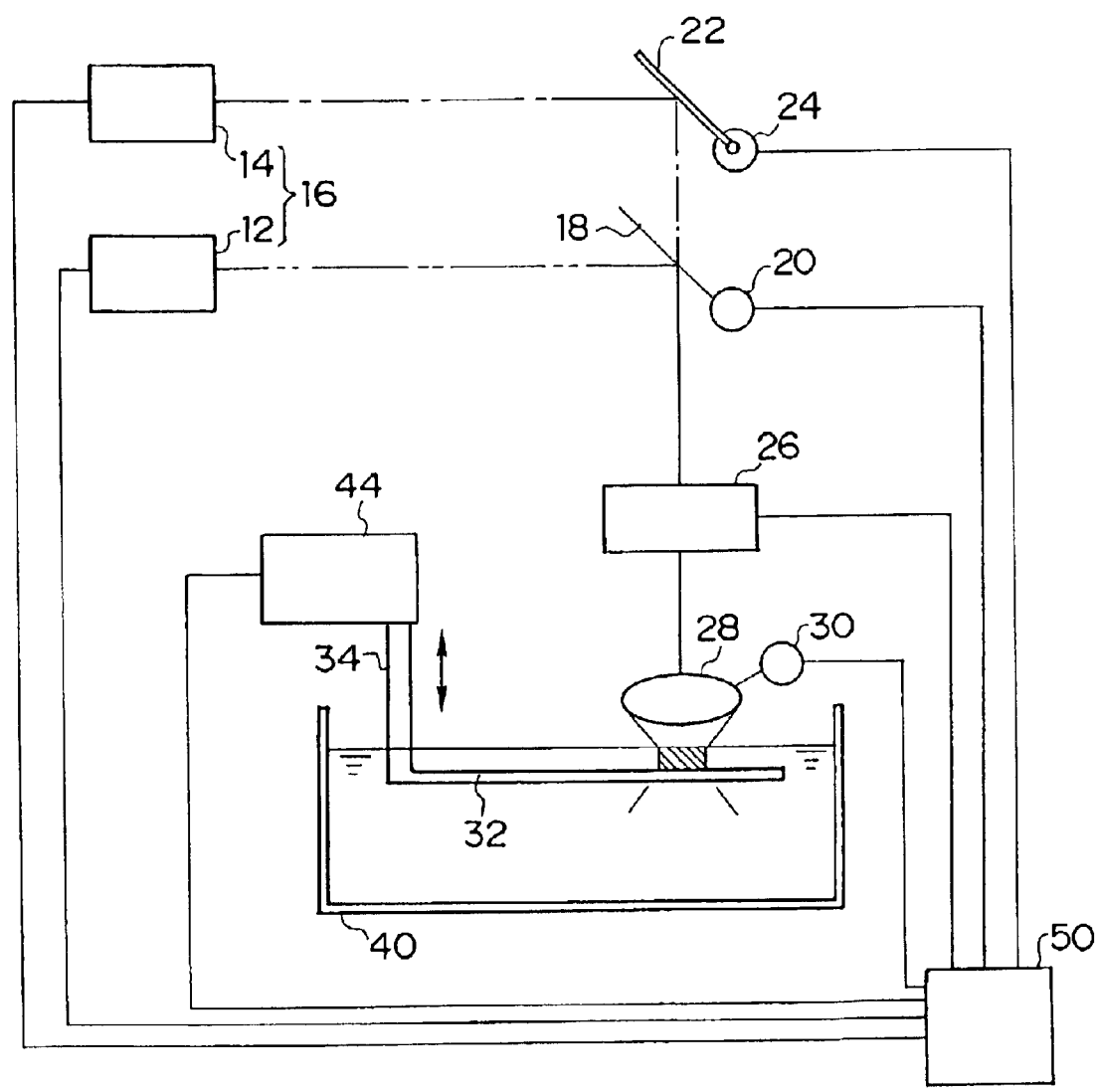
FIG. 2 is an image diagram which schematically shows the structure of the optical fabricating apparatus.

As shown in FIG. 2, the control device 50 is connected to the first laser light source 12 and to the second laser light source 14, and controls emission of laser beams from the first laser light source 12 and the second laser light source 14. A first driving section 20 for deflecting a reflection angle of the dichroic mirror 18 and a second driving section 24 for deflecting a reflection angle of the reflecting mirror 22 are also each connected to the control device 50. Further, the light modulation mechanism 26, the moving mechanism 30 and the vertical driving section 44 are also connected to the control device 50. The control device 50 is equipped with a computer including CPU, ROM and RAM, and is used to control driving of each section by a processing routine, which will be described later, for the purpose of fabricating processing.

The control device 50 may be provided with a floppy disk unit (FDU) in which a floppy disk (FD) serving as a recording medium can be removably inserted. The processing routine (described later) allows reading and writing for a floppy disk (FD) using FDU. Accordingly, the processing routine (described later) may be in advance recorded on the floppy disk and a processing program recorded on the floppy disk via FDU may be executed. Further, with a mass storage system (not shown) such as a hard-disk device being connected to the control device 50, the processing program recorded on the FD may be executed by being stored (installed) in the mass storage system. As the recording medium, an optical disc such as a CD-ROM or a DVD, a photo-magnetic disc such as an MD or an MO, or a magnetic tape such as DAT may be used. When they are used, a CD-ROM device, a DVD device, an MD device, an MO device, a tape deck or the like may be used in place of the aforementioned FDU.

Next, a process for fabricating a structure using the optical fabricating method according to the present embodiment will be described. In the present embodiment, a structure is fabricated roughly by the ultraviolet-irradiation optical fabrication process, and thereafter, fabricated finely by the two-photon absorption optical fabrication process.

Figure 3A:
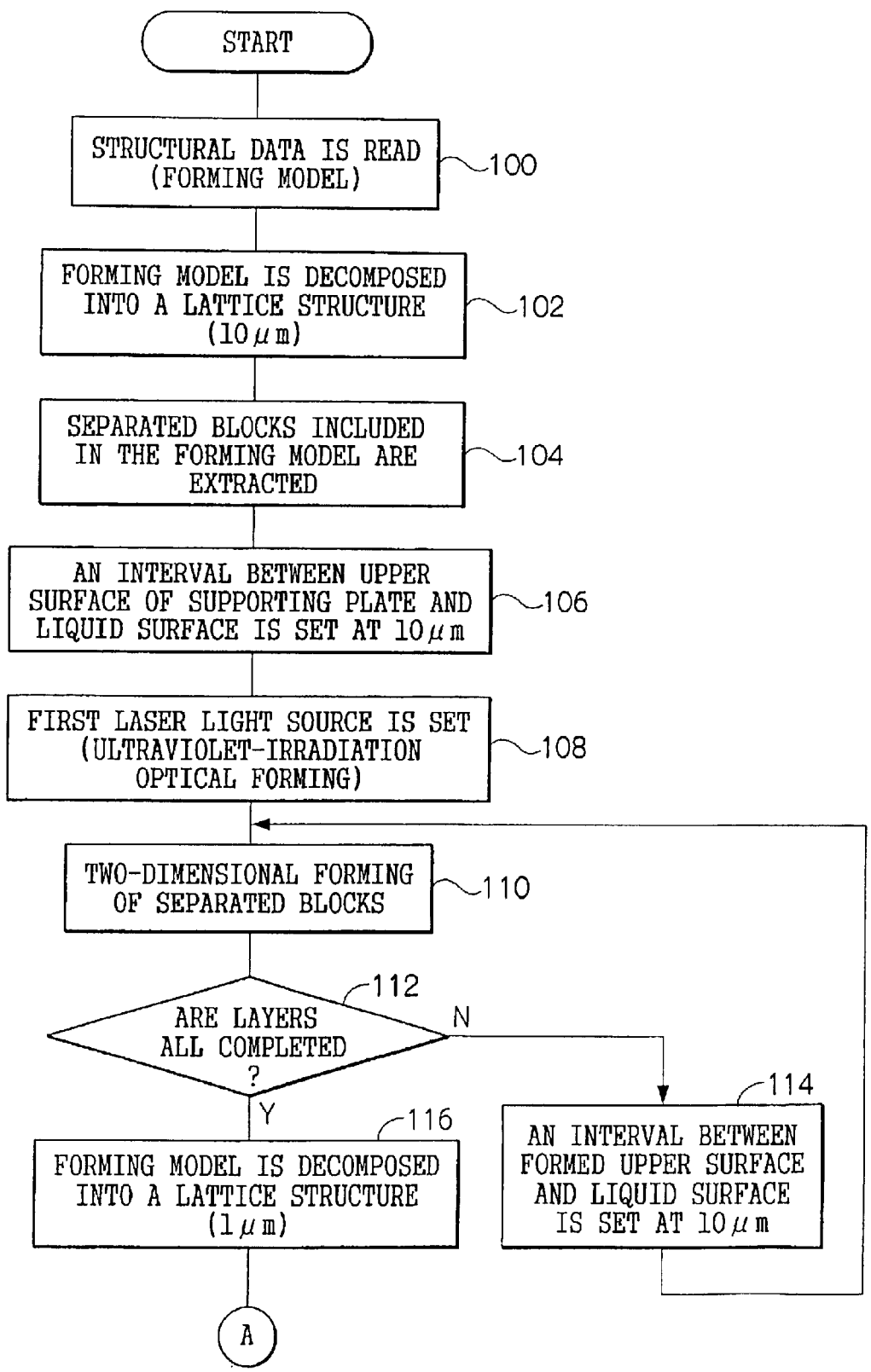
FIGS. 3A and 3B are flow charts showing the process flow of a control device, which is used to illustrate the operation of the optical fabricating apparatus according to the present embodiment.
Figure 3B:
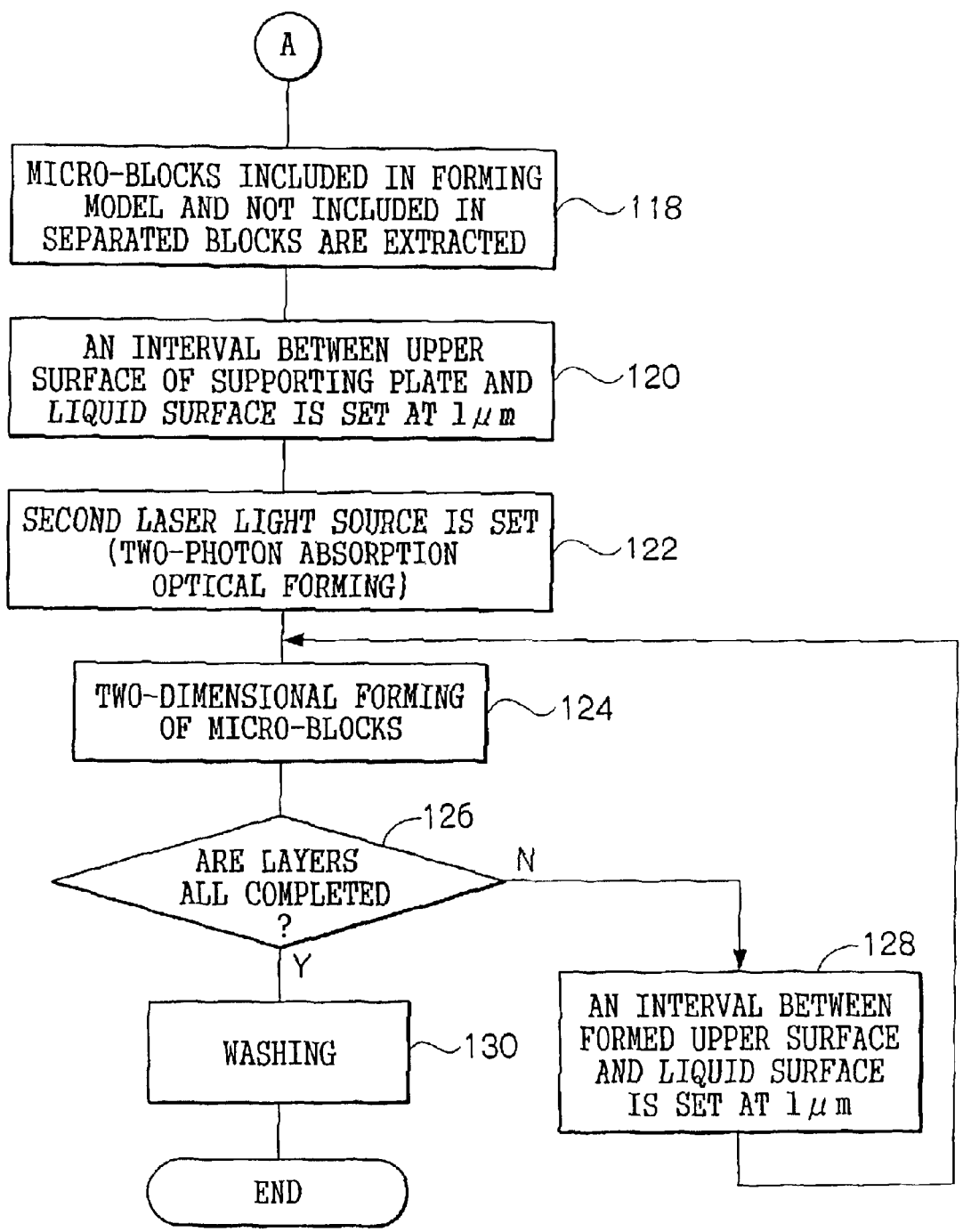

The processing routine shown in FIG. 3 is executed by the control device 50. First, in step 100, structural data of a structure to be fabricated is read. The structural data is, for example, CAD data or scan data, which is utilized for making the structure into a fabrication model for numerical analysis. In step 100, a fabrication model is prepared from the structural data. The fabrication model is one which is made into a numeric value in a data format input to a computer program prepared based on a mathematical/analytical approach.

In step 102, the fabrication model is decomposed into a lattice structure. Namely, in this case, a space of a predetermined size (in the present embodiment, the container 40) is divided into separation blocks each having a cubic shape of 10 $\mu$m in each side. The space of a predetermined size has a volume in which the fabrication model of the structure to be fabricated is completely contained. When the fabrication model is disposed in this space, it corresponds to decomposing the fabrication model into a lattice structure. A correspondence relationship between positions of the aforementioned separation blocks and the position of the fabrication model can be obtained. In step 104, separation blocks completely included in the fabrication model are extracted.

In the subsequent step 106, a control signal for driving the vertical driving section 44 is outputted so that the interval between the upper surface of the supporting plate 32 and the liquid surface of the photo-curing resin 42 becomes 10 $\mu$m. This results from that a volume to be fabricated by the ultraviolet-irradiation optical fabrication process in the present embodiment is a cube (1000 $\mu$m$^3$) of 10 $\mu$m in each side. Accordingly, the value in step 102 can be changed in accordance with the volume to be fabricated by the ultraviolet-irradiation optical fabrication process. In the subsequent step 108, in order to carry out optical fabrication using the ultraviolet-irradiation optical fabrication process, a control signal for driving the first laser light source 12 is outputted so as to allow a laser beam to be emitted from the first laser light source 12. At this point in time, the control device 50 outputs a control signal to the light modulation mechanism 26 so as to shut out a laser beam.

In step 110, optical fabrication is performed for separation blocks on the supporting plate 32. Namely, first, optical fabrication is performed for separation blocks of a lowermost layer among from separation blocks extracted in the aforementioned step 104. In this case, when a control signal is outputted to the first driving section 20 and the moving mechanism 30, the photo-curing resin 42 located on a two-dimensional plane is irradiated with a laser beam and cured. Further, the control device 50 outputs, in accordance with the position of the separation block (pattern), a control signal to the light modulation mechanism 26 so as to transmit a laser beam.

In step 112, it is determined whether fabricating for all of layers of the fabrication model has been completed. When the decision of step 112 is negative, the process proceeds to step 114. In step 114, a control signal for driving the vertical driving section 44 is outputted so that the interval between the fabricated upper surface of the layer in which fabricating has been completed and the liquid surface becomes 10 $\mu$m. Thereafter, the process returns to step 110 and the aforementioned processing is repeated.

When fabricating using the ultraviolet-irradiation optical fabrication process has been completed, the decision of step 112 is made affirmative, and the process proceeds to step 116 in which the fabrication model is decomposed into a fine lattice structure. In this case, a space of a predetermined size (in the present invention, the container 40) is divided into microscopic blocks each having a cubic shape of 1 $\mu$m in each side. When the fabrication model is disposed in this space in the same manner as described above, it corresponds to decomposing the fabrication model into a fine lattice structure, and a correspondence relationship between positions of the aforementioned microscopic blocks and the position of the fabrication model can be obtained. In step 118, microscopic blocks completely included in the fabrication model, but not included in the aforementioned separation blocks are extracted.

The extraction of microscopic blocks is not limited to extraction of the blocks which are completely included in the fabrication model. For example, when a portion of the microscopic block exists outside the fabrication model, if the ratio of a volume of that portion (a projecting portion) to the volume of the microscopic block is a predetermined value or less, it may also be extracted.

In the subsequent step 120, a control signal for driving the vertical driving section 44 is outputted so that the interval between the upper surface of the supporting plate 32 and the liquid surface of the photo-curing resin 42 becomes 1 $\mu$m. This results from that the volume to be fabricated using the two-photon absorption optical fabrication process of the present embodiment, that is, the degree of accuracy is about 1 $\mu$m$^3$. Accordingly, the value obtained in step 120 can be changed in accordance with the volume to be fabricated using the two-photon absorption optical fabrication process. In step 122, in order to carry out optical fabrication based on the two-photon absorption optical fabrication process, a control signal for driving the second laser light source 14 is outputted so as to allow a laser beam to be emitted from the second laser light source 14. That is, the second laser light source 14 is switched to the first laser light source 12 as a light source from which a laser beam is emitted. At this point in time, the control device 50 outputs a control signal to the light modulation mechanism 26 so as to shut out a laser beam.

In the subsequent step 124, optical fabrication is performed for microscopic blocks on the supporting plate 32.

Namely, first, optical fabrication is carried out for microscopic blocks of a lowermost layer among from microscopic blocks extracted in the aforementioned step 118. In this case, when a control signal is outputted to the second driving section 24 and the moving mechanism 30, the photo-curing resin 42 on a two-dimensional plane is irradiated with a laser beam and cured. Further, the control device 50 outputs, in accordance with a position (pattern) of the microscopic block, a control signal to the light modulation mechanism 26 to allow transmission of a laser beam.

In step 126, it is determined whether fabricating has been completed for all of layers of the fabrication model. When the decision of step 126 is made negative, the process proceeds to step 128. In step 128, a control signal for driving the vertical driving section 44 is outputted so that the interval between the fabricated upper surface of the layer in which the fabricating has been completed and the liquid surface becomes 1 $\mu$m. Thereafter, the process returns to step 124 and the aforementioned processing is repeated.

When fabricating using the two-photon absorption optical fabrication process has been completed, the decision of step 126 is made affirmative, and the process proceeds to step 130 in which washing processing is carried out. That is, the cured photo-curing resin 42 is taken out and sprayed with or immersed in a solvent in which an uncured portion is soluble and a cured portion is not soluble, for example, methanol, thereby allowing washout of the uncured photo-curing resin 42.

In the present embodiment, rough optical fabrication using the ultraviolet-irradiation optical fabrication process has been performed, and thereafter, fine optical fabrication using the two-photon absorption optical fabrication process is continuously performed. Therefore, it is possible to realize optical fabrication which allows fabrication of a microscopic structure using the two-photon absorption optical fabrication process while realizing high speed processing using the ultraviolet-irradiation optical fabrication process.

In the present embodiment, there was described a case in which the photo-curing resin 42 is cured from the liquid surface of the photo-curing resin 42. However, the present invention is not limited to the same. For example, a structure can be fabricated in such a manner that layers of the structure are fabricated from the uppermost layer thereof on the bottom surface of a supporting plate at a distance from a transparent container.

Next, a description will be given of an example of a structure fabricated by the optical fabricating method according to the present embodiment.

Figure 4A:
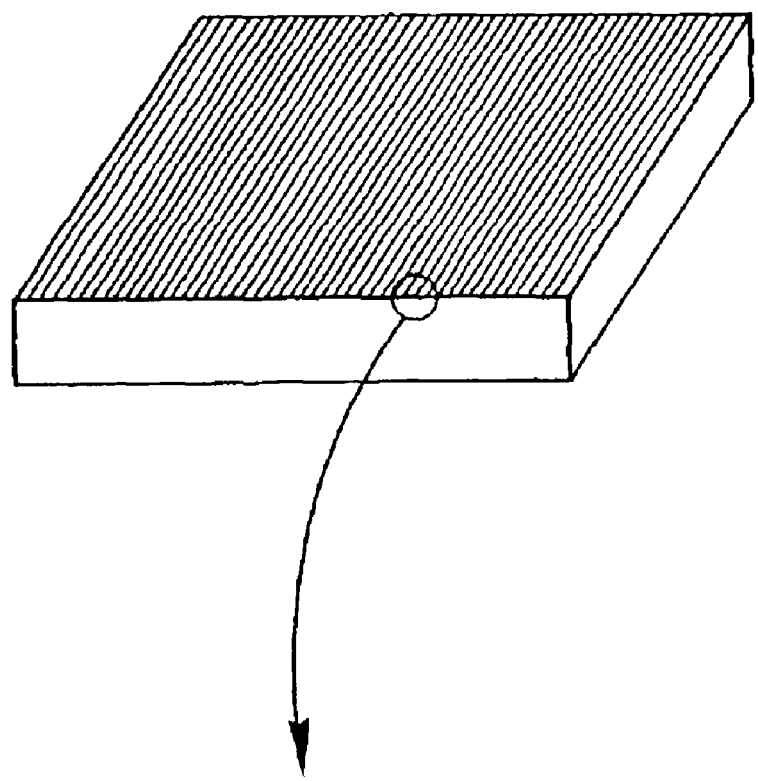
FIGS. 4A and 4B each schematically show a fabricated structure.
Figure 4B:
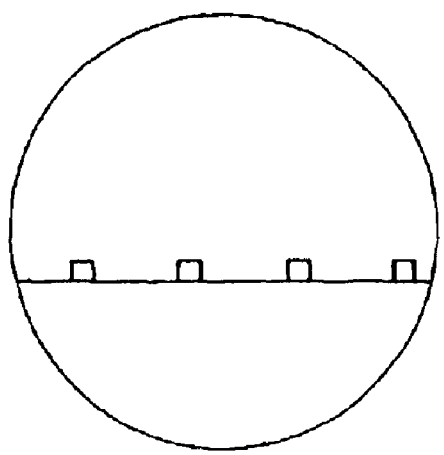

FIGS. 4A and 4B each schematically show a formed structure. FIG. 4A is a perspective diagram showing the outside of the structure, and FIG. 4B is a partially enlarged view. The structure shown therein is one in which swelling portions each having a width of 1 $\mu$m and a height of 1 $\mu$m are fabricated on a square base plate, which is 5 mm in each side and 100 $\mu$m in thickness, and disposed in a striped manner at intervals of 5 $\mu$m. This structure is used for the purpose of light dispersion, which is known as diffraction grating.

The structure shown in FIGS. 4A and 4B cannot be obtained by rough optical fabrication using the ultraviolet-irradiation optical fabrication process from the standpoint of a high degree of accuracy thereof. However, in the case of using the fine optical fabrication by the two-photon absorption optical fabrication process, a sufficiently high degree of processing accuracy is obtained, but the structure cannot be obtained in a practical fabricating time.

In other words, in the structure shown in FIGS. 4A and 4B, the volume of the base plate portion is 2.5 e$^9$($\mu$m$^3$)=

5000×5000×100 and the volume of the striped portions is 5 e$^6$($\mu$m$^3$)=1×1×5000. Accordingly, in the fabricating using the two-photon absorption optical fabrication process, the fabricating time of the base plate portion is predominant and 289 days (=2.5 e$^9$($\mu$m$^3$)×0.01 (s/$\mu$m$^3$)=2.5 e$^7$ (second)) are required.

In the present embodiment, the ultraviolet-irradiation optical fabrication process is used for fabricating the base plate portion and the two-photon absorption optical fabrication process is used for fabricating the striped portions. The fabricating time of the base plate portion is 25 seconds (=2.5 e$^9$($\mu$m$^3$)×1 e$^{-8}$(s/$\mu$m$^3$)) and the fabricating time of the striped portions is 14 hours (=5 e$^6$($\mu$m$^3$)×0.01 (s/$\mu$m$^3$)). That is, a structure of necessary accuracy can be fabricated in a short time (approximately 14 hours).

[Second Embodiment]

Next, a second embodiment of the present invention will be described. The second embodiment has the substantially same structure as that of the aforementioned embodiment. Therefore, the same members as those of the first embodiment will be denoted by the same reference numerals, and a description thereof will be omitted.

In the first embodiment, each laser beam is emitted from the respective light sources, namely, laser beams are emitted from the light source used for optical fabrication using the ultraviolet-irradiation optical fabrication process, and the light source used for optical fabrication using the two-photon absorption optical fabrication process. However, use of two kinds of light sources increases costs, and this is not preferable for the entire optical fabricating apparatus 10. Accordingly, in the present embodiment, optical fabrication is realized which allows fabrication of a fine structure using the two-photon absorption fabricating process while realizing high speed processing by the ultraviolet-irradiation optical fabrication process using a single light source.

Figure 5:
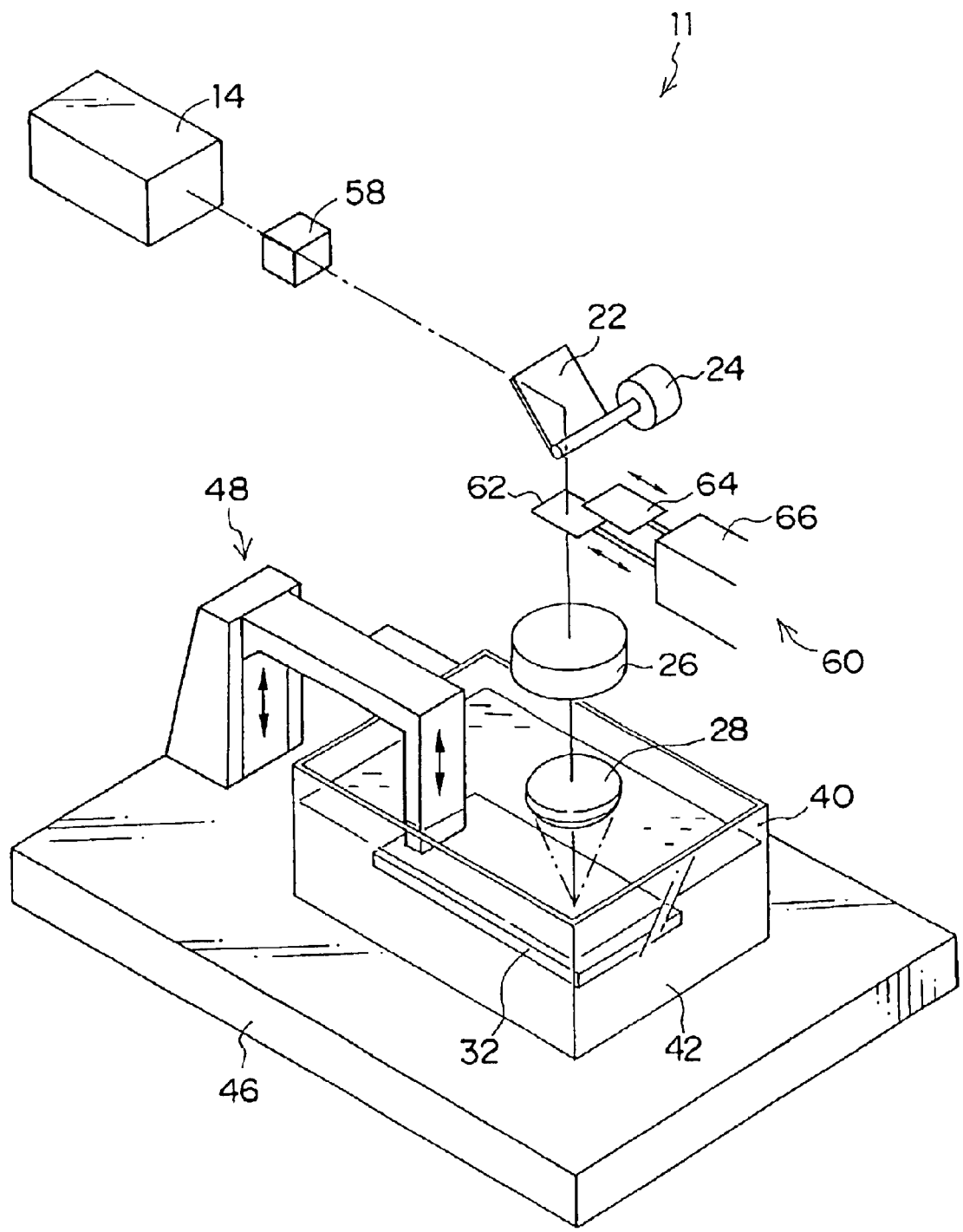
FIG. 5 is a schematic diagram showing the outside of an optical fabricating apparatus according to a second embodiment of the present invention.
Figure 6:
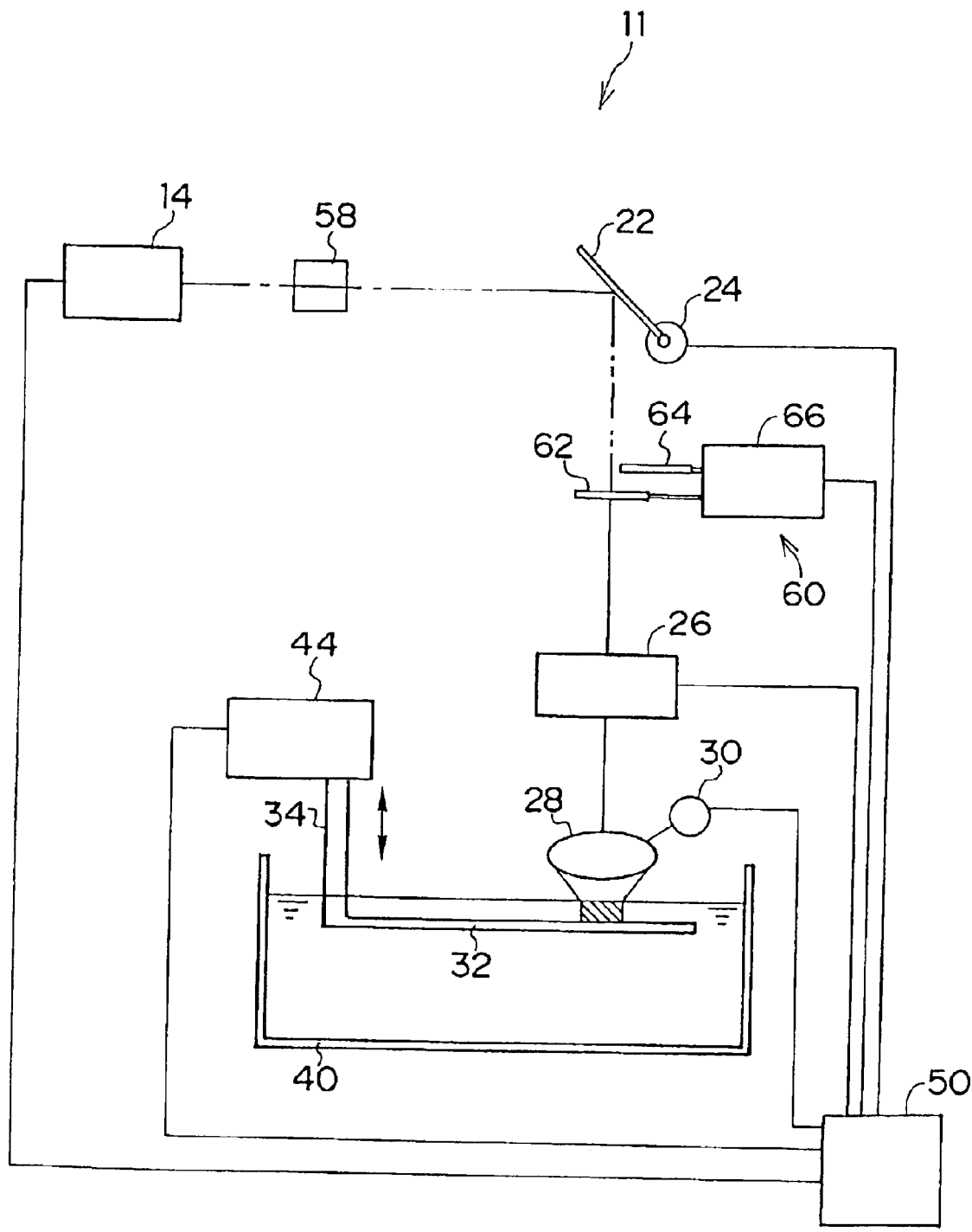
FIG. 6 is an image diagram which schematically shows the structure of the optical fabricating apparatus according to the second embodiment of the present invention.

FIGS. 5 and 6 each schematically show the structure of an optical fabricating apparatus 11 according to the second embodiment to which the present invention can be applied. The optical fabricating apparatus 11 of the present embodiment is comprised of only the second laser light source 14 serving as the light source section 16. That is, the second laser light source 14 is a light source used to carry out optical fabrication using the two-photon absorption optical fabrication process, and a pulse laser having a wavelength of 700 nm is used. Accordingly, the first laser light source 12, dichroic mirror 18 and first driving section 20, which belongs to the structure of the first laser light source 12, are not necessary.

A wavelength conversion section 58 is provided at the side of the second laser light source 14 from which light is emitted. The wavelength conversion section 58 is an optical element which converts a part of a laser beam of 700 nm emitted from the second laser light source 14 to a laser beam of 350 nm. The wavelength conversion section 58 allows a laser beam merely transmitted and subjected to no SHG conversion and a laser beam subjected to SHG conversion to be propagated substantially on the same optical axis. For example, the wavelength conversion section 58 may be a non-linear optical crystal system which produces a second harmonic (SHG), and BBO is used as an example of the element. BBO can produce a laser beam of 350 nm from a laser beam of 700 nm. The second laser light source 14 of the present embodiment has a high peak value of output power at a short pulse, and therefore, a non-linear effect is efficiently exhibited and SHG can be produced at a high conversion efficiency. When BBO is used, SHG conversion light of 5 mW or more can be obtained at an average excitation power of 40 mW.

A filter mechanism 60 is provided at a light reflection side of the reflecting mirror 22, which is disposed at a light emission side of the second laser light source 14, and at a position corresponding to the dichroic mirror 18 shown in FIG. 2. The filter mechanism 60 is provided with a first optical filter 62 and a second optical filter 64. The first optical filter 62 and the second optical filter 64 are mounted in an insertion/drawing portion 66. The insertion/drawing portion 66 is connected to the control device 50, and is driven by a control signal from the control device 50 so that one of the first optical filter 62 and the second optical filter 64 is inserted (pulled out) in an optical path.

The first optical filter 62 is a filter which transmits ultraviolet rays so as to realize optical fabrication using the ultraviolet-irradiation optical fabrication process, specifically, an optical filter which transmits SHG conversion light. The second optical filter 64 is a filter which shuts out ultraviolet rays so as to realize optical fabrication using the two-photon absorption optical fabrication process, specifically, an optical filter which shuts out SHG conversion light.

According to the aforementioned structure, the process flow for fabricating a structure becomes similar to that of FIG. 3. In this case, the control device 50 controls in such a manner that setting of the first laser light source 12 in step 108 of FIG. 3 is changed to insertion of the first optical filter 62 and setting of the second laser light source 14 in step 122 is changed to insertion of the second optical filter 64.

In the present embodiment, rough optical fabrication using the ultraviolet-irradiation optical fabrication process, and fine optical fabrication using the two-photon absorption optical fabrication process can be realized by a single light source, and therefore, in addition to the aforementioned effects of the present embodiments, the following effects are further obtained. First, use of a single light source allows formation of an apparatus at a low cost. Second, two wavelengths (two laser beams) can be produced on the substantially same optical axis by wavelength conversion by SHG, thereby making it possible to reduce a complicated operation such as optical adjustment for each light source.

As described above, in the present invention, a structure is fabricated in such a manner that, after preprocessing of light irradiation by a first light source is carried out, main processing in which a photo-curing material is irradiated with light in which a multiple-photon absorption phenomenon is caused by a second light source. Therefore, an effect in which a fine structure can be fabricated in a short time is obtained.

[Third Embodiment]

Figure 11:
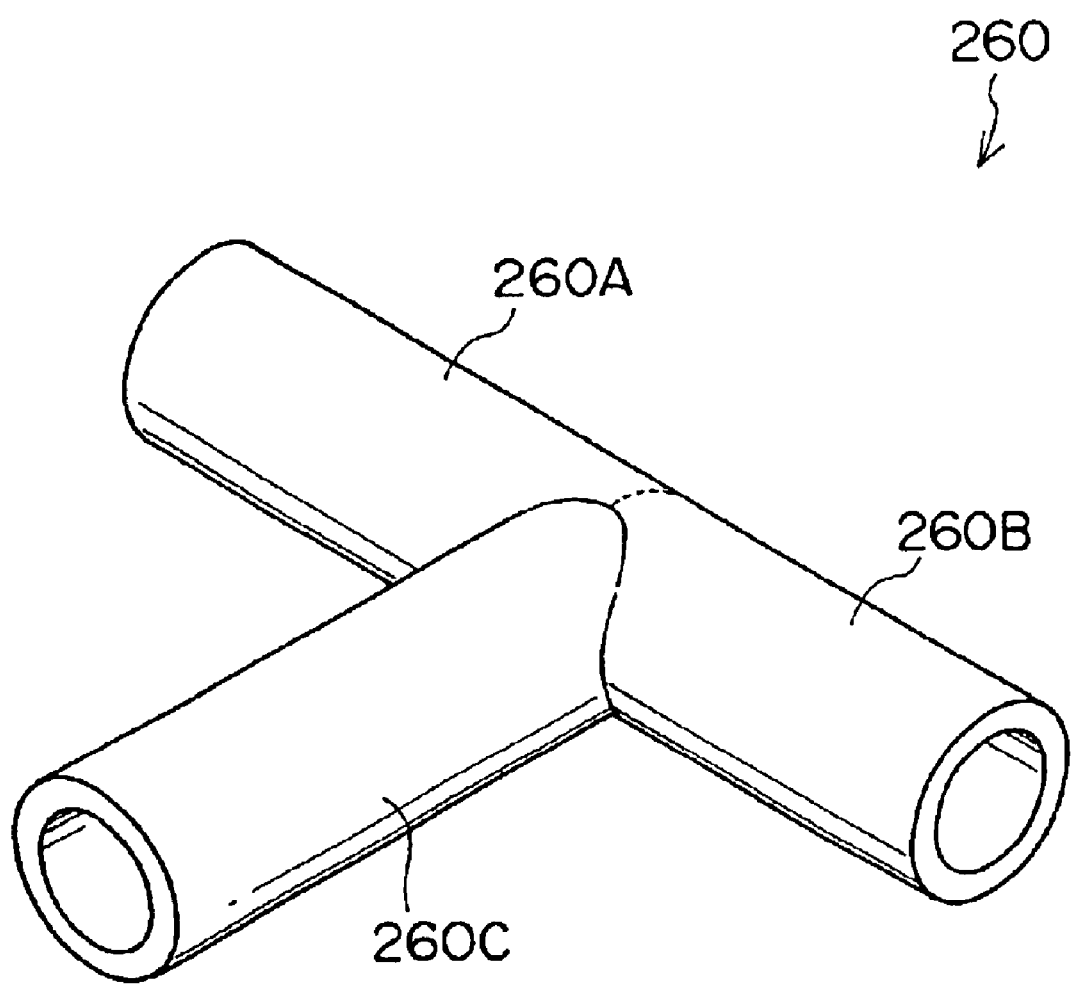
FIG. 11 is a diagram for illustrating a difficulty in optical fabrication.

A description will be hereinafter given of fabrication of a structure 260 shown in FIG. 11 using an optical fabricating method. The structure 260 is a joint comprised of three pipes 260A, 260B and 260C each having an inside diameter of 10 $\mu$m, an outside diameter of 20 $\mu$m and a length of 100 $\mu$m. The pipe 260A and the pipe 260B are joined together and the pipe 260C is connected at a position, in which the pipes 260A and 260B are connected, orthogonal to the pipes 260A and 260B. These pipes are formed so that respective internal holes thereof communicate with one another.

The structure 260 has a volume of approximately 70650 ($\mu$m$^3$) {=3×100×(10$^2$−5$^2$)×3.14}. When the structure is fabricated by the two-photon absorption optical fabrication process, at least 11.8 (min) (=706.5 (s)=70650×0.01) is required. Because a throughput in the aforementioned process is low, fabricating a large quantity of such complicated structures practically becomes a problem. Reduction of the fabricating time is demanded.

The present inventor has focused attention on that high-speed mass production of an article having a simple shape is possible without using optical fabrication by the two-photon absorption optical fabrication process. In this embodiment, high-speed and highly accurate optical fabrication is realized in such a manner that an article of a simple shape is subjected to optical fabrication using the two-photon absorption optical fabrication process.

Figure 7:
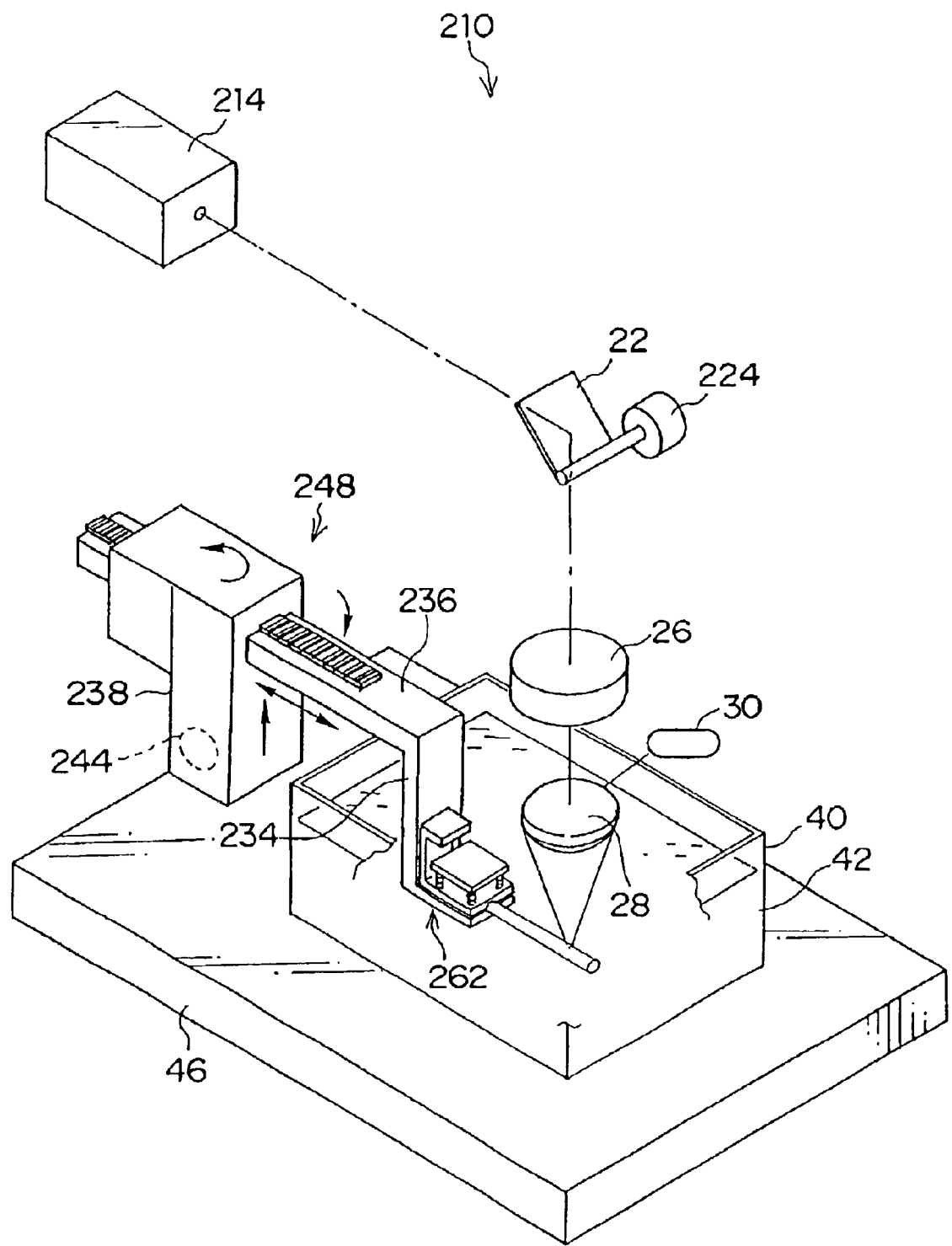
FIG. 7 is a schematic diagram showing the outside of an optical fabricating apparatus according to a third embodiment of the present invention.

FIG. 7 schematically shows the structure of an optical fabricating apparatus 210 according to the third embodiment of the present invention. Note that the same members as those of the first embodiment will be denoted by the same reference numerals, and a description thereof will be omitted. The optical fabricating apparatus 210 of the present embodiment is comprised of a laser light source 214. The laser light source 214 is connected to a control device 250 (see FIG. 8) which controls a process for optical fabrication in accordance with a predetermined pattern.

As the laser light source 214, a laser light source of the same kind as the second laser light source 14 of the first embodiment can be used.

The reflecting mirror 22 is provided at a side of the laser light source 214 from which light is emitted. It suffices that the reflecting mirror 22 may reflect at least a laser beam emitted from the laser light source 214. Specifically, a reflecting mirror which reflects light having a wavelength of 700 nm or thereabouts is used. The reflecting mirror 22 is mounted at a deflection driving section 224 for deflecting reflected light in biaxial directions which intersect the optical axis, thereby allowing two-dimensional scanning of spot light. The light modulation mechanism 26 and the focusing lens 28 are sequentially provided at the light reflection side of the reflecting mirror 22.

A container 40 is positioned on a desk (base plate 46) at the side of the focusing lens 28 in which light is focused. The container 40 is mounted (placed) on the base plate 46 at a predetermined position. A position adjusting mechanism 248 is provided on the base plate 46. The position adjusting mechanism 248 is comprised of a supporting pole 238, an arm 236, a pole 234, a supporting plate 232 and a position-adjustment driving section 244. A holding mechanism 262 for holding an article is mounted in the position adjusting mechanism 248, and the position and angle of the article held by the holding mechanism 262 are adjusted by the position adjusting mechanism 248.

Specifically, the supporting pole 238, at which the arm 236 disposed above the container 40 is mounted, is fixed onto the base plate 46. The supporting plate 232 and the pole 234, at which the holding mechanism 262 for holding an article is mounted, are mounted at an end of the arm 236. The vertical movement and rotation of the pole 234 is adjusted by the position-adjustment driving section 244. The holding mechanism 262 can be immersed in the photo-curing resin 42 accommodated in the container 40, and an interval between an article held by the holding mechanism 262 and the liquid surface of the photo-curing resin 42 can be adjusted by vertical movement of the container 40. That is, the position of an article held by the holding mechanism 262 is adjusted by an operation of the position adjusting mechanism 248 and the container 40 is thereby moved vertically.

Figure 9:
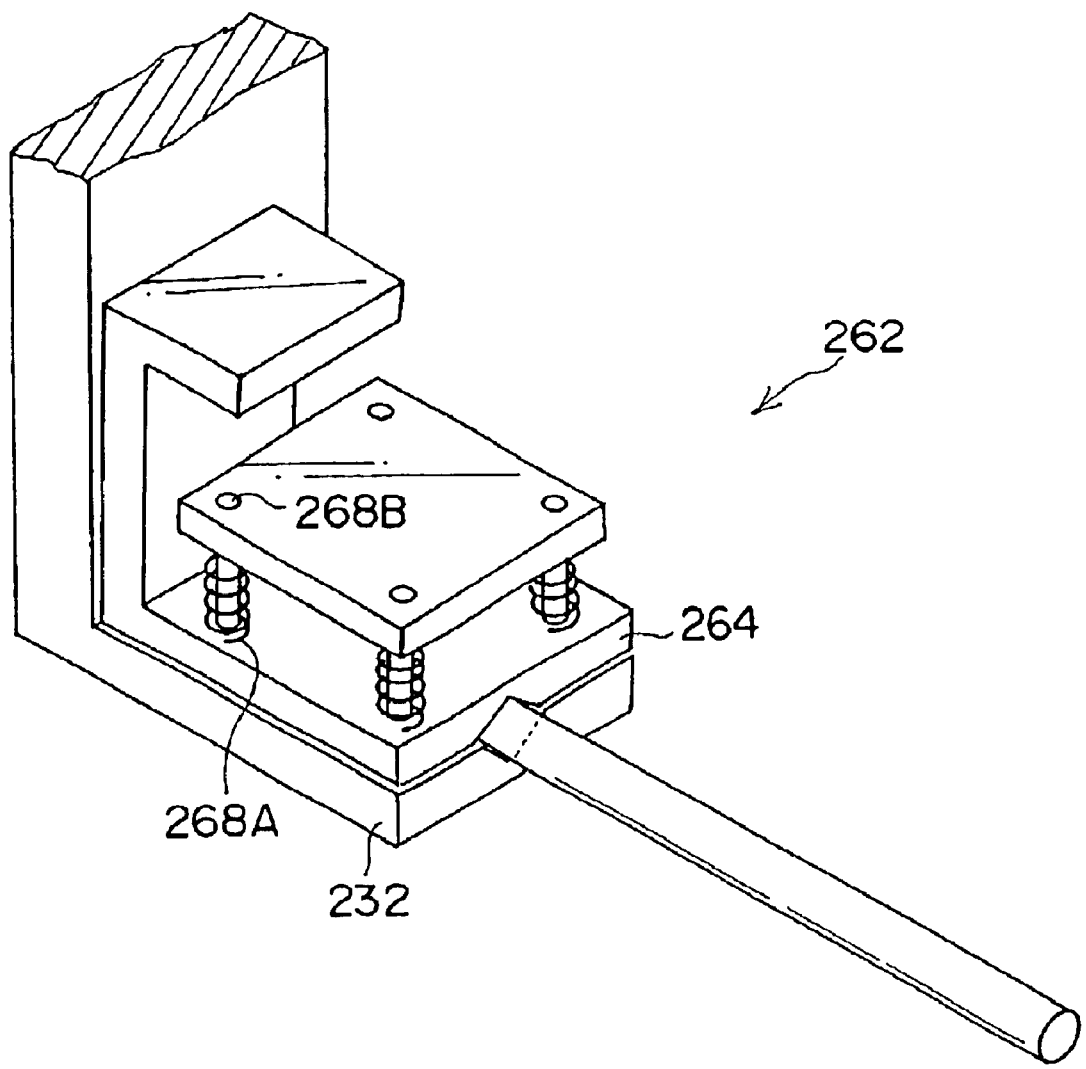
FIG. 9 is a perspective view showing a holding mechanism for holding an article at the time of optical fabrication.

As shown in FIG. 9, in one example of the holding mechanism 262, a movable plate 264 supported by shafts 268B fastened to the supporting plate 232 is urged by springs 268A toward the supporting plate 232. As a result, an article can be held between the supporting plate 232 and the movable plate 264.

Figure 8:
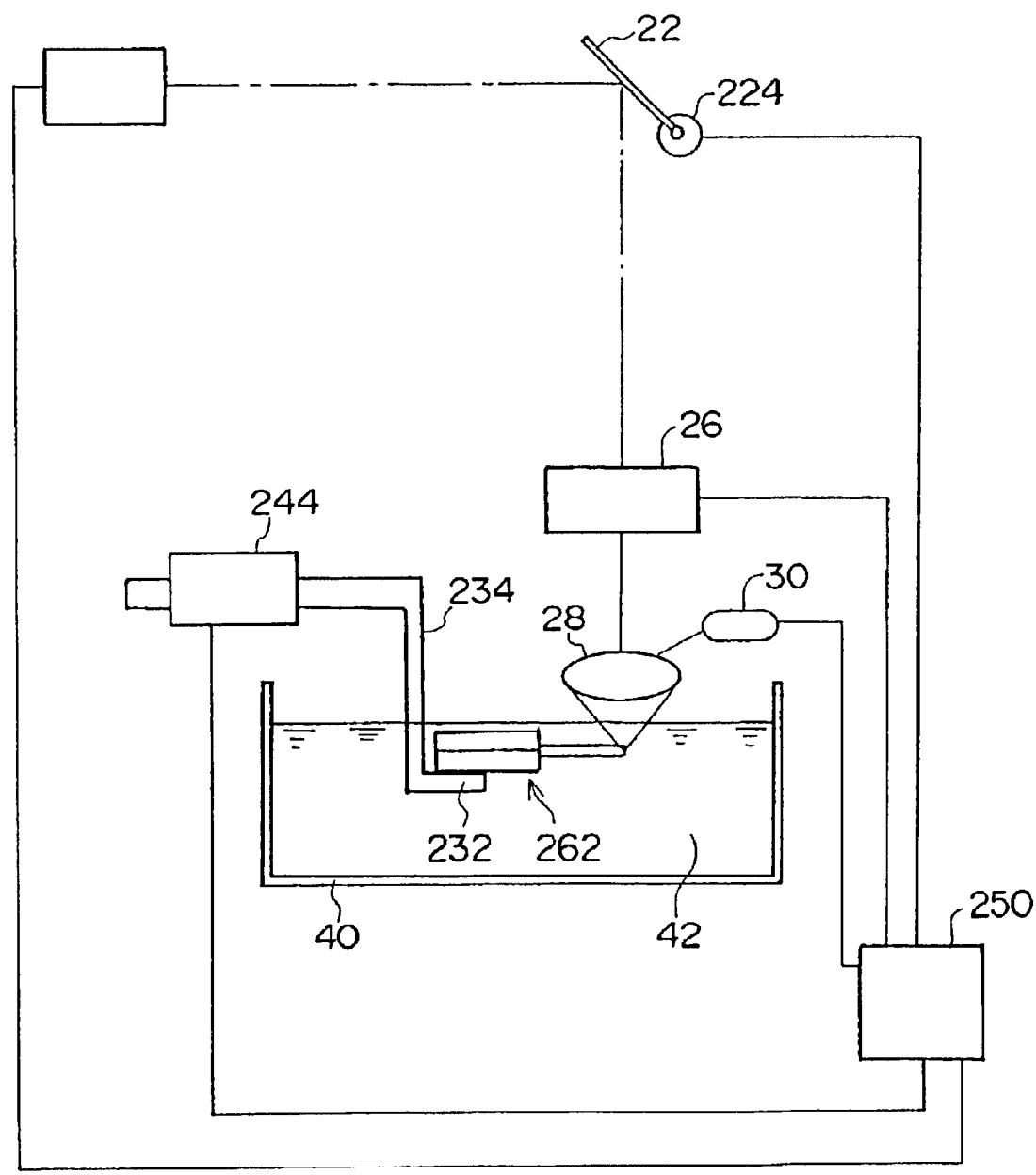
FIG. 8 is an image diagram which schematically shows the structure of the optical fabricating apparatus.

As shown in FIG. 8, the control device 250 is connected to the laser light source 214 and controls emission of a laser beam from the laser light source 214. The deflection driving section 224 for deflecting a reflection angle of the reflecting mirror 22 is also connected to the control device 250. Further, the light modulation mechanism 26, the moving mechanism 30 and the position-adjustment driving section 244 are also connected to the control device 250.

Next, a description will be given of a process of fabricating a structure using an optical fabricating method according to the present embodiment. In the present embodiment, fine fabricating is added to a previously prepared article using the two-photon absorption optical fabrication process to form a structure.

Figure 10:
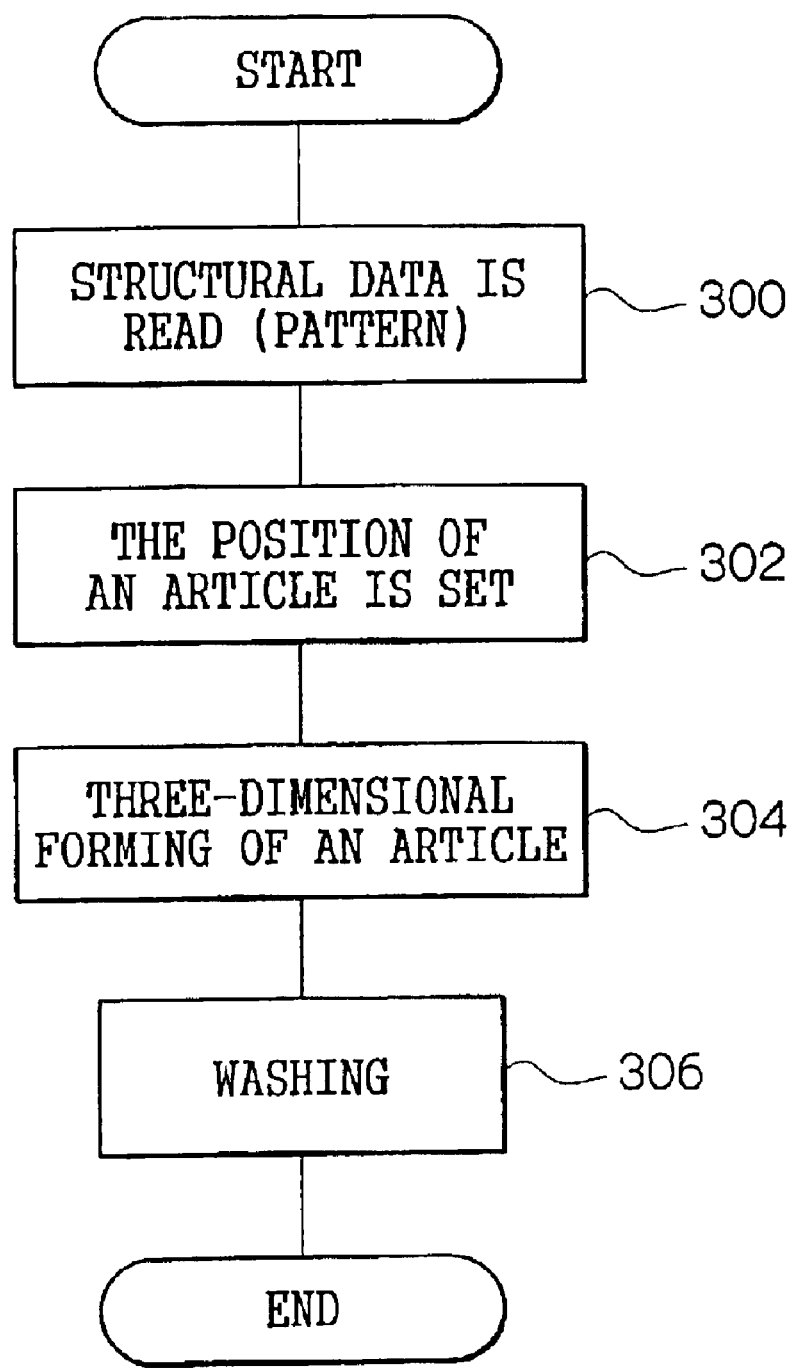
FIG. 10 is a flow chart showing the process flow of a control device, which is used to illustrate the operation of the optical fabricating apparatus according to the present embodiment.

A processing routine shown in FIG. 10 is executed by the control device 250. First, in step 300, structural data of a structure to be fabricated is read. The structural data may be CAD data or scan data, which is used to make the structure into a fabrication model of numerical analysis. In step 300, a pattern not including an article held by the holding mechanism 262 is prepared from the structural data. This pattern is a numeric value in a data format inputted to a computer program prepared based on a mathematical/analytical approach.

In the subsequent step 302, the article is held by the holding mechanism 262 and set so as to be positioned at an initial reference point of fabricating. In step 304, a control signal for driving the position-adjustment driving section 244 is outputted. This operation is carried out to focus a laser beam to a position of an article for optical fabrication by the two-photon absorption optical fabrication process in the present embodiment. For the purpose of optical fabrication using the two-photon absorption optical fabrication process, the laser light source 214 is driven so as to emit a laser beam therefrom. At this point in time, the control device 250 outputs a control signal to the light modulation mechanism 26 so as to shut out a laser beam. Thereafter, optical fabrication is performed in accordance with a pattern read in the aforementioned step 300. In this case, with the control signal being outputted to the deflection driving section 224 and the moving mechanism 30, the photo-curing resin 42 in the three-dimensional space is irradiated with a laser beam and cured. Further, the control device 250 controls, in accordance with the pattern, outputs a control signal to the light modulation mechanism 26 so as to transmit a laser beam.

When optical fabrication using the two-photon absorption optical fabrication process is completed, the process proceeds to step 306 in which washing processing is carried out. That is, the cured photo-curing resin 42 is taken out and sprayed with or immersed in a solvent in which an uncured portion is soluble and a cured portion is not soluble, for example, methanol, thereby allowing washout of the uncured photo-curing resin 42.

As described above, in the present embodiment, fine optical fabrication using the two-photon absorption optical fabrication process is added to a previously produced article. Therefore, only a fine structure can be fabricated by the two-photon absorption optical fabrication process, and highly accurate optical fabrication can be realized in a short time.

In the present embodiment, a case was described in which the photo-curing resin 42 is cured by being irradiated with light from the liquid surface of the photo-curing resin 42. However, the present invention is not limited to the same. For example, a structure may be fabricated in such a manner that light is applied from a bottom surface of a supporting plate at a distance from a transparent container.

Next, a description will be given of an example in which a structure is fabricated by the optical fabrication of the present embodiment.

Figure 12A:
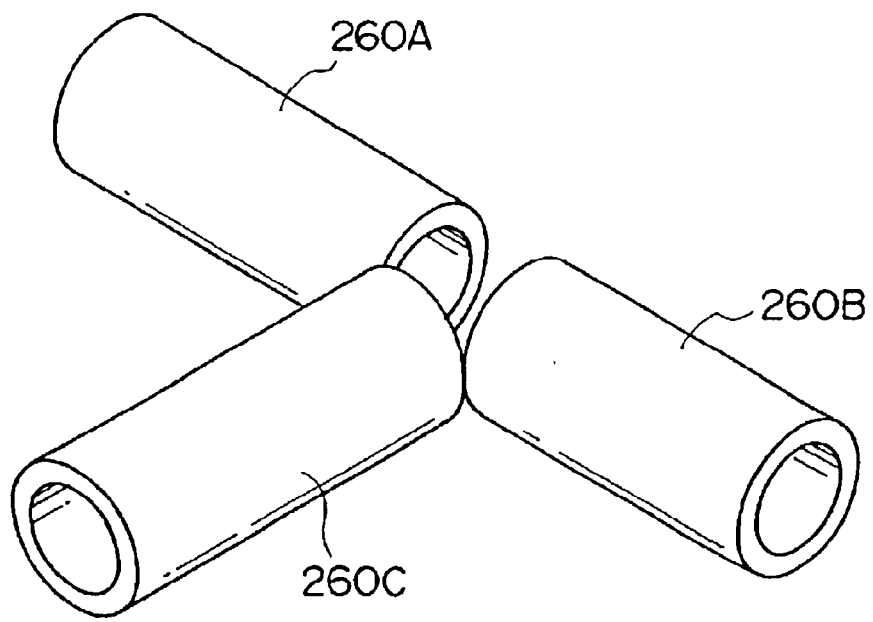
FIGS. 12A and 12B each schematically show a process for fabricating a structure.
Figure 12B:
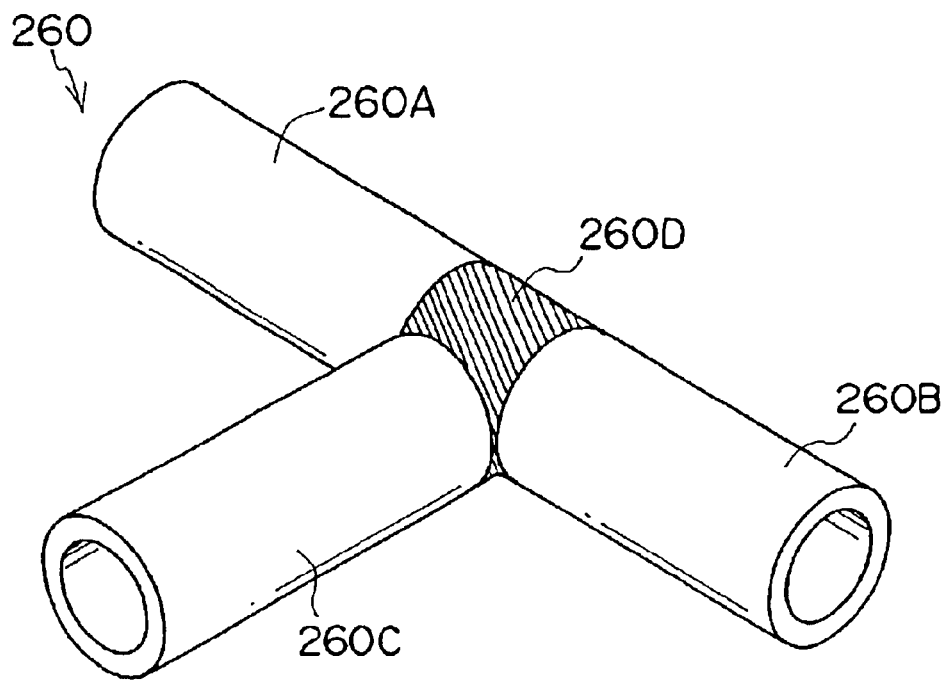

FIGS. 12A and 12B each schematically show the process for fabricating a structure. FIG. 12A is a diagram showing an arrangement of components for fabricating a structure to be fabricated, and FIG. 12B is a diagram showing the outside of the fabricated structure.

The structure 260 is formed using, as components, three pipes 260A, 260B and 260C each having an inside diameter of 10 μm, an outside diameter of 20 μm and a length of 100 μm. A substantially transparent glass material can be used for these pipes. Further, the material of these pipes is not limited to glass, and a transparent material or a semitransparent material may also be used. For example, plastic resin or the like can also be used. The three pipes 260A, 260B and 260C are held by the holding mechanism 262 so that the pipes 260A and 260B are positioned coaxially and the pipe 260C is positioned on an axis which intersects a common axis of the pipes 260A and 260B. These pipes are held at a predetermined interval therebetween so that respective internal holes thereof communicate with one another. The pipes are held so as not to shut out a laser beam based on the two-photon absorption optical fabrication process.

Next, optical fabrication is carried out for a connecting portion 260D of the three pipes 260A, 260B and 260C using the aforementioned two-photon absorption optical fabrication process. In this case, the connecting portion 260D to be cured is fabricated generally in the shape of a pipe having an inside diameter of 10 μm and an outside diameter of 20 μm, and a horizontal hole for communicating each of the internal holes of the three pipes 260A, 260B and 260C, so as to match the pipes 260A to 260C.

The volume of the structure 260D thus fabricated is 4710 ($\mu m^3$)(=20×($10^2$−$5^2$)×3.14) or less. Accordingly, the fabricating time in the two-photon absorption optical fabrication process is 0.8 (min)(=47.1 (s)=4710×0.01), and compared with a conventional fabricating time (11.8 min+0.8 min= 12.6 min), the fabricating time can be substantially reduced.

Next, a description will be given of an example in which another structure is fabricated by the optical fabrication of the present embodiment. As another structure, fabricating of a check valve in a passage is employed. The check valve mentioned herein is used to control the flow of gas or fluid in one direction. Herein, a case in which the checked value is fabricated within a hollow pipe previously fabricated will be described.

Figure 13A:
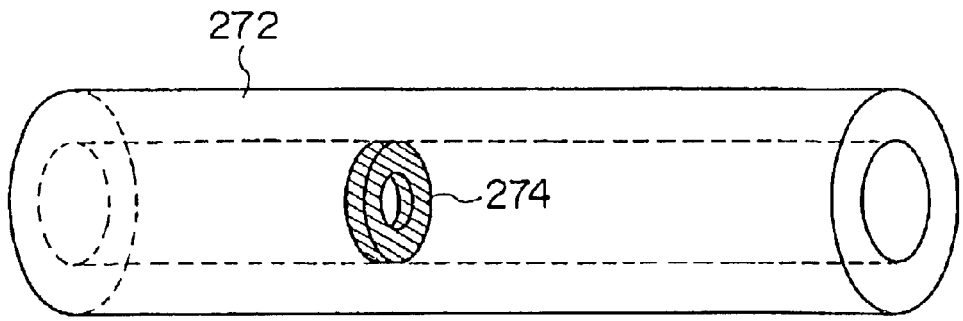
FIGS. 13A, 13B and 13C each schematically show a process for fabricating a check valve.
Figure 13B:
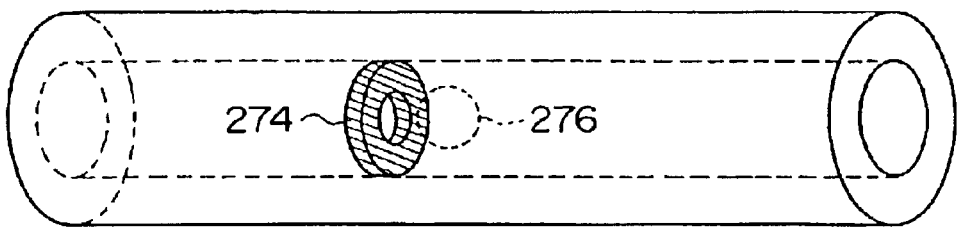
Figure 13C:
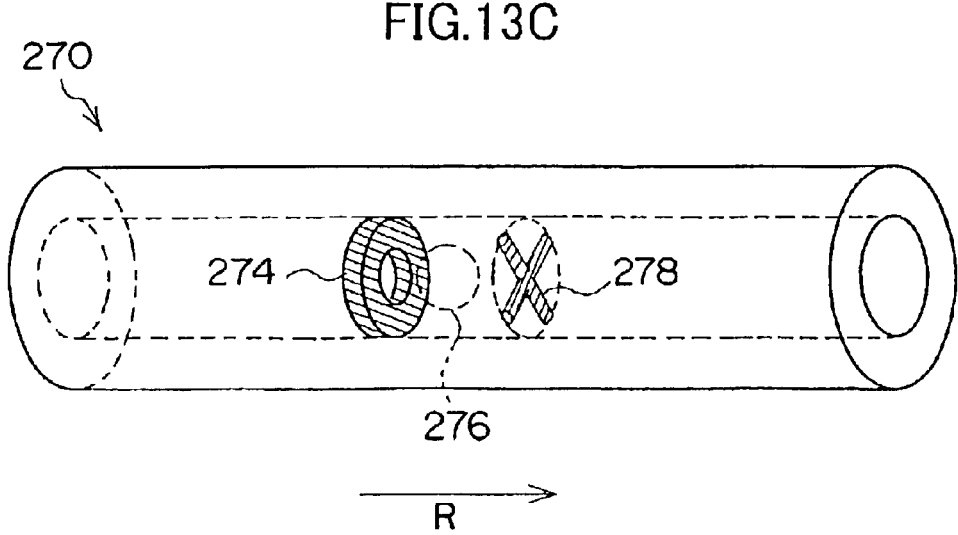

FIGS. 13A to 13C each schematically show a process of fabricating a structure. FIG. 13A is a diagram showing a closed passage for closing a passage, which serves as a check valve, FIG. 13B is a diagram showing an obturator for closing a passage, which serves as a check valve, and FIG. 13C is a diagram showing the outside of a fabricated structure.

A structure 270 is formed using, as a component, a pipe 272 having an inside diameter of 10 μm, an outside diameter of 20 μm and a length of 100 μm. As shown in FIG. 9A, the pipe 272 shown in FIG. 13A is held by the holding mechanism 262. A disk-shaped closing plate 274 having an inside diameter of 5 μm, an outside diameter of 10 μm and a width of 5 μm is optically fabricated inside the pipe 272 using the aforementioned two-photon absorption optical fabrication process. After the optical fabrication, washing processing is once performed to remove an uncured portion of the photo-curing resin 42.

As shown in FIG. 13B, a glass ball 276 which is 6 μm in diameter, previously prepared, is inserted in the pipe 272 using an operating device such as a micro-manipulator. This inserting operation can be carried out by observing the glass ball under a microscope or the like.

Subsequently, the pipe 272 is held again by the holding mechanism 262. As shown in FIG. 13C, a cross-shaped portion 278, by which prevents passing of the glass ball 276 without closing the passage, is fabricated at a predetermined position at a side of the closing plate 274 opposite to a side at which the glass ball 276 is disposed.

The structure 270 thus fabricated allows a fluid to pass through the inside thereof in the direction indicated by arrow R in FIG. 13C, but not to pass through the inside thereof in a direction opposite to the direction indicated by arrow R because a passage is closed by the glass ball 276 arriving at the closing plate 274, and the flow of the fluid is cut off. The structure 270 having a function as a check valve can be easily fabricated as described above. It is clear that the structure 270 can also be fabricated in a short time compared with a case in which optical fabrication is carried out for all using a two-photon absorption optical fabrication process (namely, a case in which the pipe 272 is also fabricated using a two-photon absorption optical fabrication process).

Further, in the structure 270, a transparent material having the same refractive index as the photo-curing resin 42, for example, a glass pipe, is used. Therefore, a light spot can be formed (light focusing is allowed) even in the interior of the pipe, and optical fabrication using the two-photon absorption optical fabrication process can be effectively utilized. Furthermore, the position and angle of an article is easily adjusted by the position-adjustment driving section 244, thereby facilitating free fabrication of a structure.

Thus, in the present embodiment, a fine structure can be fabricated for a previously produced article by optical fabrication using the two-photon absorption optical fabrication process. Therefore, fabrication of a structure, which was conventionally difficult, is facilitated.

As described above, in the present invention, a structure is fabricated in a previously fabricated article in such a manner that a photo-curing material is irradiated with light which causes a multiple photon absorption phenomenon. Therefore, it is possible to form a fine structure in a short time.

What is claimed is:

1. An optical fabricating apparatus in which a photo-curing material, which is accommodated in a container and cured by being irradiated with light, is irradiated with light at an energy level necessary to cure the photo-curing material to thereby fabricate a structure, said apparatus comprising:

a light source section having a first light source which applies a first light to the photo-curing material, and a second light source which outputs a second light that causes a multiple photon absorption phenomenon when applied to the photo-curing material;

a light focusing section which focuses light so that energy of the first light and of the second light reaches an energy level necessary to cure the photo-curing material;

a changing section for changing a position in which light is focused by the light focusing section in the container; and a control section which controls so as to effect a preprocessing, in which light irradiation by the first light source and changing of a light focusing position are performed, so that a pre-shape, which is determined on the basis of a size of a structure of a predetermined shape to be fabricated, is fabricated, and thereafter, a main processing, in which light irradiation by the second light source and changing of the light focusing position are performed, so that the predetermined shape is fabricated from the pre-shape.

2. The apparatus of claim 1, wherein the changing section comprises a scanning section for scanning two-dimensionally a position in which light from the light source section is focused, and a moving section for moving at least one of the light focusing position and a position of the photo-curing material in a direction intersecting a scan surface scanned by the scanning section.

3. The apparatus of claim 2, wherein the light source section comprises a switching section which effects switching between irradiation by the first light source and irradiation by the second light source to allow irradiation of light from one of the light sources.

4. The apparatus of claim 3, wherein the switching section is an exchanging section which exchanges a filter to one of a first optical filter which transmits light from the first light source, and a second optical filter which transmits light from the second light source.

5. The apparatus of claim 1, wherein the first light source emits light having a wavelength in an ultraviolet region.

6. The apparatus of claim 1, wherein the second light source includes a harmonic generating element and makes light emitted from the first light source into second light by which the multiple photon absorption phenomenon occurs.

7. The apparatus of claim 1, wherein the pre-shape is fabricated based on a first block and smaller than the predetermined shape, and the predetermined shape is fabricated from the pre-shape based on a second block which is smaller than the first block.

8. An optical fabricating method in which a photo-curing material, which is accommodated in a container and cured by being irradiated with light, is irradiated with light at an energy level necessary to cure the photo-curing material to thereby fabricate a structure, said method comprising the steps of:
focusing light so that light energy of a first light applied to the photo-curing material and a second light that causes a multiple photon absorption phenomenon when applied to the photo-curing material reaches an energy level necessary to cure the photo-curing material;
applying the first light so that a pre-shape, which is determined on the basis of a size of a structure of a predetermined shape to be fabricated, is fabricated, and thereafter, applying the second light so that the predetermined shape is fabricated from the pre-shape, while changing a light focusing position in the container, thereby fabricating the structure of the predetermined shape.

9. The method of claim 8, wherein the light focusing position is scanned in a two-dimensional manner and at least one of the light focusing position and a position of the photo-curing material is moved in a direction intersecting a scan surface, thereby allowing the light focusing position to change in the container.

10. The method of claim 8, wherein when the photo-curing material is irradiated with light, irradiation of one of the first light and the second light is carried out in an exchangeable manner.

11. The method of claim 8, wherein the first light is one having a wavelength in an ultraviolet region.

12. The method of claim 8, wherein the second light is one, by which the multiple photon absorption phenomenon occurs, generated from the first light by a harmonic generating phenomenon.

13. The method of claim 12, wherein when the photo-curing material is irradiated with light, one of a first optical filter which transmits the first light and a second optical filter which transmits the second light is used in an exchangeable manner.

14. The method of claim 8, wherein the pre-shape is fabricated based on a first block and smaller than the predetermined shape, and the predetermined shape is fabricated from the pre-shape based on a second block which is smaller than the first block.

15. The apparatus of claim 7, wherein three dimensional data of the structure of the predetermined shape to be fabricated is read, the read three dimensional data is divided into first blocks and second blocks, and portions of the photo-curing material corresponding to the respective first blocks and portions of the photo-curing material corresponding to the respective second blocks are irradiated with the first light and the second light, respectively.

16. An optical fabricating apparatus in which a photo-curing material, which is accommodated in a container and cured by being irradiated with light, is irradiated with light at an energy level necessary to cure the photo-curing material to thereby fabricate a structure, said apparatus comprising:
a light source section which outputs light that causes a multiple photon absorption phenomenon when applied to the photo-curing material;
a light focusing section which focuses light so that light energy from the light source section becomes an energy level necessary to cure the photo-curing material;
a holding section which can be immersed in the photo-curing material accommodated in the container and which holds a previously-fabricated article;
a changing section for changing a position at which light is focused by the light focusing section in the container; and
a control section which controls, in order to fabricate a structure of a predetermined shape, irradiation of light by the light source section near the article, and changing of the light focusing position.

17. The apparatus of claim 16, wherein the article is fabricated from one of a transparent material and a semi-transparent material.

18. An optical fabricating method in which a photo-curing material, which is accommodated in a container and cured by being irradiated with light, is irradiated with light at an energy level necessary to cure the photo-curing material to thereby fabricate a structure, said method comprising the steps of:
focusing light so that light energy of light, which causes a multiple photon absorption phenomenon when applied to the photo-curing material, reaches an energy level necessary to cure the photo-curing material;
immersing a previously-fabricated article in the photo-curing material accommodated in the container;
changing a position in which light is focused in the container; and
in order to fabricate a structure of a predetermined shape, applying light, which causes the multiple photon absorption phenomenon, near the article, and changing the light focusing position in the container, thereby allowing fabrication of the structure of a predetermined shape.

19. The method of claim 18, wherein the article is fabricated from one of a transparent material and a semi-transparent material.

20. An optical fabricating apparatus for irradiating a container of photo-curing material to fabricate a structure of a predetermined shape, the apparatus comprising:

a light source that outputs a first light and that outputs a second light that causes a multiple photon absorption phenomenon when applied to the photo-curing material;

a focusing section that focuses the first light and the second light onto the photo-curing material;

a changing section for changing a position of the structure of a predetermined shape within the container relative to light that is focused by the focusing section and relative to a liquid level of the photo-curing material; and a control section that controls irradiation of the first light and the position of the changing section to fabricate a pre-shape based on a size of the structure of a predetermined shape, and then controls irradiation of the second light and the position of the changing section to fabricate the structure of a predetermined shape from the pre-shape.

21. The apparatus of claim 20, wherein the changing section comprises:

a scanning section for two-dimensionally scanning a position of the focused light from the focusing section, and a moving section for moving at least one of the position of the focused light and a position of the photo-curing material in a direction intersecting a surface scanned by the scanning section.

22. The apparatus of claim 21, wherein the light source comprises a switching section that switches between the first light and the second light.

23. The apparatus of claim 22, wherein the switching section is an exchanging section which exchanges a filter to one of a first optical filter that transmits the first light and a second optical filter that transmits the second light.

24. The apparatus of claim 20, wherein the first light has a wavelength in an ultraviolet region.

25. The apparatus of claim 20, wherein the light source comprises a harmonic generating element to convert the first light into the second light.

26. An optical fabricating method for irradiating a container of photo-curing material to fabricate a structure of a predetermined shape, wherein the method comprises:

focusing a first light onto the photo-curing material to fabricate a pre-shape of the structure of a predetermined shape, wherein a position of cured photo-curing material is moved relative to the focused first light during the fabrication of the pre-shape and relative to a liquid level of the photo-curing material; and focusing a second light, which causes multiple photon absorption phenomenon when applied to the photo-curing material, onto the photo-curing material to fabricate the structure of a predetermined shape from the pre-shape, wherein a position of cured photo-curing material is moved relative to the focused second light during the fabrication of the structure of a predetermined shape.

27. The method of claim 26, wherein a focused light position is two-dimensionally scanned, and wherein at least one of the focused light position and a position of the photo-curing material is moved in a direction intersecting a scanned surface.

28. The method of claim 26, wherein the second light is harmonically generated from the first light.

29. An optical fabricating apparatus for irradiating a container of photo-curing material to fabricate a structure of a predetermined shape, the apparatus comprising:

a light source that outputs light that causes a multiple photon absorption phenomenon when applied to the photo-curing material;

a focusing section that focuses light from the light source onto the photo-curing material;

a holding section that can be immersed in the photo-curing material and that holds a previously-fabricated article;

a changing section for changing a position of the structure of a predetermined shape; and a control section which controls the irradiation by the light source and the position of the previously-fabricated article within the photo-curing material relative to the focused light from the focusing section and relative to a liquid level of the photo-curing material to fabricate the structure of a predetermined shape from the previously-fabricated article.

30. The apparatus of claim 29, wherein the previously fabricated article is fabricated from one of a transparent material and a semi-transparent material.

31. The method of claim 30, wherein the previously fabricated article is fabricated from one of a transparent material and a semi-transparent material.

32. An optical fabricating method for irradiating a container of photo-curing material to fabricate a structure of a predetermined shape, wherein the method comprises:

immersing a previously-fabricated article in the photo-curing material accommodated in the container;

focusing light onto the photo-curing material to cure the photo-curing material; and controlling the irradiation of the focused light and the position of the previously-fabricated article within the photo-curing material relative to the focused light and relative to a liquid level of the photo-curing material to fabricate the structure of a predetermined shape from the previously-fabricated article.

33. An optical fabricating apparatus in which a photo-curing material, which is accommodated in a container and cured by being irradiated with light, is irradiated with light at an energy level necessary to cure the photo-curing material to thereby fabricate a structure, said apparatus comprising:

a light source section having a first light source which applies a first light to the photo-curing material, and a second light source which applies a second light, which causes a multiple photon absorption phenomenon, to the photo-curing material;

a light focusing section which focuses light so that energy of the first light and of the second light reaches an energy level necessary to cure the photo-curing material;

a changing section for changing a position of the structure within the container; and a control section which controls so as to effect a preprocessing, in which light irradiation by the first light source and changing of a position of the changing section are performed, so that a pre-shape, which is determined on the basis of a size of a structure of a predetermined shape to be fabricated, is fabricated, and thereafter, a main processing, in which light irradiation by the second light source and changing of the position of the changing section are performed, so that the predetermined shape is fabricated from the pre-shape.

34. An optical fabricating method in which a photo-curing material, which is accommodated in a container and cured by being irradiated with light, is irradiated with light at an energy level necessary to cure the photo-curing material to thereby fabricate a structure, said method comprising the steps of:

focusing light so that light energy of a first light applied to the photo-curing material and a second light applied to the photo-curing material and causing a multiple photon absorption phenomenon becomes an energy level necessary to cure the photo-curing material;

applying the first light so that a pre-shape, which is determined on the basis of a size of a structure of a predetermined shape to be fabricated, is fabricated, and thereafter, applying the second light so that the predetermined shape is fabricated from the pre-shape, while changing a position of the pre-shape in the container, thereby fabricating the structure of the predetermined shape.

35. An optical fabricating apparatus in which a photo-curing material, which is accommodated in a container and cured by being irradiated with light, is irradiated with light at an energy level necessary to cure the photo-curing material to thereby fabricate a structure, said apparatus comprising:

a light source section which applies light, which causes a multiple photon absorption phenomenon, to the photo-curing material;

a light focusing section which focuses light so that light energy from the light source section becomes an energy level necessary to cure the photo-curing material;

a holding section which can be immersed in the photo-curing material accommodated in the container and which holds a previously-fabricated article;

a changing section for changing a position of the article within the container; and a control section which controls irradiation of light by the light source section near the article, and changing of the position of the article to fabricate the structure from the article.

36. An optical fabricating method in which a photo-curing material, which is accommodated in a container and cured by being irradiated with light, is irradiated with light at an energy level necessary to cure the photo-curing material to thereby fabricate a structure, said method comprising the steps of:

focusing light so that light energy of light applied to the photo-curing material and causing a multiple photon absorption phenomenon becomes an energy level necessary to cure the photo-curing material;

immersing a previously-fabricated article in the photo-curing material accommodated in the container;

changing a position of the article within the container; and applying light, which causes the multiple photon absorption phenomenon, near the article, and changing the position of the article within in the container, thereby allowing fabrication of the structure of a predetermined shape from the article.

* * * * *